(12) United States Patent
Ohata

(10) Patent No.: US 8,289,625 B2
(45) Date of Patent: Oct. 16, 2012

(54) ZOOM LENS AND IMAGING APPARATUS

(75) Inventor: Atsushi Ohata, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/137,595

(22) Filed: Aug. 29, 2011

(65) Prior Publication Data

US 2012/0081796 A1 Apr. 5, 2012

(30) Foreign Application Priority Data

Sep. 30, 2010 (JP) ................................. 2010-221338

(51) Int. Cl.
*G02B 15/14* (2006.01)

(52) U.S. Cl. ....................................... 359/682; 359/689

(58) Field of Classification Search .......... 359/680–682, 359/689

See application file for complete search history.

(56) References Cited

U.S. PATENT DOCUMENTS 7,209,296 B2 * 4/2007 Mihara et al. ................. 359/676

FOREIGN PATENT DOCUMENTS

| JP | 2007-014059 | 1/2007 |
| JP | 2007-102182 | 4/2007 |
| JP | 2008-241794 | 10/2008 |
| JP | 2008-292911 | 12/2008 |
| JP | 2009-020337 | 1/2009 |
| JP | 2009-251433 | 10/2009 |

* cited by examiner

*Primary Examiner* — Scott J Sugarman

(74) *Attorney, Agent, or Firm* — Rader Fishman & Grauer, PLLC

(57) ABSTRACT

In a zoom lens, a first lens group having a negative refractive power, a second lens group having a positive refractive power, and a third lens group having the positive refractive power are disposed from an object side to an image side; and in a phase of variable magnification from a wide-angle end to a telescopic end, the first lens group is moved and the second lens group is moved to the object side such that an air interval between the first lens group and the second lens group is decreased and an air interval between the second lens group and the third lens group is increased.

6 Claims, 13 Drawing Sheets

ZOOM LENS AND IMAGING APPARATUS

BACKGROUND

The present disclosure relates to a zoom lens and an imaging apparatus. More particularly, the disclosure relates to a technique of a zoom lens which is miniaturized and increased in variable magnification and which is suitable for an image capturing optical system of a digital I/O apparatus such as a digital still camera or a digital video camera, and an imaging apparatus including the same.

In recent years, an imaging apparatus such as a digital still camera using a solid-state imaging element is becoming widely use. Along with such popularization of the digital still camera, the further increased image quality is required. In the digital still camera or the like having a large number of pixels, an image capturing lens superior in imaging performance, especially, a zoom lens is required. In addition, beside this, a request for miniaturization, an increased field angle, and an increased variable magnification is also recently high. Thus, a high-performance and compact zoom lens is required.

There are many kinds of zoom lenses for use in the digital still camera. A three-group zoom optical system is known as a lens type suitable for the miniaturization and the increased field angle. In this case, in the three-group zoom optical system, a first lens group having a negative refractive power, a second lens group having a positive refractive power, and a third lens group having the positive refractive power are disposed in order from an object side to an image side. Such a three-group zoom optical system, for example, is described in Japanese Patent Laid-Open Nos. 2007-102182, 2007-14059, 2008-241794, 2008-292911, 2009-20337, and 2009-251433 (hereinafter referred to as Patent Documents 1 to 6).

In each of the zoom lenses described in Patent Documents 1 to 6, there is proposed a compact zoom lens in which the first lens group is composed of two sheets of lenses.

SUMMARY

However, in each of the zoom lenses described in Patent Documents 1 and 2, respectively, the second lens group is composed of either two sheets of cemented lenses, or two sheets of positive lenses and a cemented lens. Thus, a thickness of the second lens group is large. In addition, an amount of movement of the second lens group playing the variable magnification is small relative to an average value of an optical total length between a telescopic end and a wide-angle end, and thus the optical total length is long relative to the variable magnification ratio. Therefore, in particular, the optical total length in a phase of storage of the zoom lens becomes long. In addition, the variable magnification ratio is set smaller than 3.9, and thus it is hard to say that the compatibility between the miniaturization and the increased variable magnification is sufficiently carried out.

In the zoom lens described in Patent Document 3, the variable magnification ratio is set equal to or larger than 5.9, and thus the increased variable magnification is realized. However, in the zoom lens described in Patent Document 3, a lens interval of the first lens group is long relative to the optical total length of the telescopic end, and the optical total length of the telescopic end is long relative to a focal length of the telescopic end. In addition, the second lens group is composed of two sheets of cemented lenses, and a movable aperture stop is disposed. Therefore, the optical total length in the phase of the storage of the zoom lens becomes long, and thus it is hard to say that the sufficient miniaturization is realized.

In the zoom lens described in Patent Document 4, the second lens group is composed of a cemented lens obtained by joining three sheets of lenses to one another. However, a thickness of the cemented lens is large, and the optical total length is set long relative to the focal length of the telescopic end. In addition, the variable magnification ratio is set smaller than 3.9, and thus it is hard to say that the compatibility between the miniaturization and the increased variable magnification is sufficiently carried out.

In the zoom lens described in Patent Document 5, the optical total length of the telescopic end is long relative to the total length of the telescopic end, the second lens group is composed of two sheets of positive lenses and a cemented lens, and thus the thickness of the second lens group is large. In addition, the variable magnification ratio is set to about 3.8, and thus it is hard to say that the compatibility between the miniaturization and the increased variable power is sufficiently carried out.

In the zoom lens described in Patent Document 6, the variable magnification ratio is set to about 4.7 and thus the increased variable power is realized. However, since a refractive index of the second lens in the first lens group is not set to a sufficiently large value, an interval between the first lens and the second lens becomes long relative to the optical total length of the telescopic end. In addition, the second lens group is composed of a positive cemented lens, a negative cemented lens, and a positive lens which are disposed in order from the object side to the image side. Thus, a sum of thicknesses of the lens groups is large relative to the variable magnification ratio and also the optical total length of the telescopic end is large relative to the focal length of the telescopic end. In particular, the optical total length in the phase of the storage of the zoom lens is long. Therefore, it is hard to say that the sufficient miniaturization is realized.

The present disclosure has been made in order to solve the problems described above, and it is therefore desirable to provide a zoom lens in which miniaturization and an increased variable magnification can be realized, and an imaging apparatus including the same.

In order to attain the desire described above, according to an embodiment of the present disclosure, there is provided a zoom lens, in which a first lens group having a negative refractive power, a second lens group having a positive refractive power, and a third lens group having the positive refractive power are disposed in order from an object side to an image side; in a phase of variable magnification from a wide-angle end to a telescopic end, the first lens group is moved and the second lens group is moved to the object side in such a way that an air interval between the first lens group and the second lens group is decreased and an air interval between the second lens group and the third lens group is increased; the first lens group is constructed in such a way that a negative lens whose both surfaces are formed in aspherical surfaces, respectively, and whose concave surface is directed to the image side, and a positive meniscus lens whose both surfaces are formed in spherical surfaces, respectively, and whose convex surface is directed to the object side are disposed in order from the object side to the image side; a fixed aperture stop is disposed in a vicinity of the second lens group; and conditional expressions (1) to (8) are fulfilled:

$$\nu 12 < 20; \tag{1}$$

$$n12 > 1.95; \tag{2}$$

$$(L11 \sim L12)/Lt < 0.07; \tag{3}$$

$$Lt/ft < 1.65; \tag{4}$$

$$0.9 < Lt/Lw < 1.1; \quad (5)$$

$$\beta 2t/\beta 2w > 4.3; \quad (6)$$

$$L2Gtw/\{(Lt+Lw)/2\} > 0.45; \text{ and} \quad (7)$$

$$(L1G+L2G+L3G)/\{\alpha \cdot (ft \cdot fw)^{1/2}\} < 0.2 \quad (8)$$

where ν12 is an Abbe's number of the positive meniscus lens of the first lens group, n12 is a refractive index in a d line of the positive meniscus lens of the first lens group, L11~L12 is an air interval from a surface apex on the image side of the negative lens of the first lens group to a surface apex on the object side of the positive meniscus lens of the first lens group, Lt is a distance from the surface apex on the object side the negative lens of the first lens group to an image capturing surface in the telescopic end, ft is a focal length of an entire lens system in the telescopic end, Lw is a distance from the surface apex on the object side of the negative lens of the first lens group to the image capturing surface in the wide-angle end, β2t is a transverse magnification of the second lens group in the telescopic end, β2w is a transverse magnification of the second lens group in the wide-angle end, L2Gtw is an amount of movement of the second lens group in the phase of the variable magnification from the wide-angle end to the telescopic end, L1G is a distance from the surface apex on the object side to the surface apex on the image side of the first lens group, L2G is a distance from the surface apex on the object side to the surface apex on the image side of the second lens group, L3G is a distance from the surface apex on the object side to the surface apex on the image side of the third lens group, α is a variable magnification ratio, and fw is a focal length of the entire lens system in the wide-angle end.

Therefore, in the zoom lens of the embodiment, the increased variable magnification is carried out after the entire optical length is shortened.

Preferably, in the zoom lens described above, in the lens group, at least a first positive lens whose surface on the object side is formed in an aspherical surface, and a cemented lens obtained by joining a second positive lens and a negative lens to each other are disposed in order from the object side to the image side, and conditional expressions (9) and (10) are fulfilled:

$$\nu 21 > 60; \text{ and} \quad (9)$$

$$(L21 \sim L23)/ft < 0.18 \quad (10)$$

where ν21 is an Abbe's number of the first positive lens of the second lens group, and L21~L23 is a distance from a surface apex on the object side of the first positive lens of the second lens group to a surface apex on the image side of the cemented lens.

The second lens group is constructed in the manner as described above, and the conditional expressions (9) and (10) are fulfilled, which results in that the correction for the spherical aberration and the chromatic aberration can be satisfactorily carried out while the second lens group is given the strong positive refractive power, and also the optical total length can be shortened.

Preferably, in the zoom lens described above, the first positive lens is a lens whose convex surface is directed to the object side, and the aperture stop is disposed closer to the image side than to the surface apex on the object side of the first positive lens, and closer to the object side than to the surface apex on the image side of the first positive lens.

The aperture stop is disposed closer to the image side than to the surface apex on the object lens of the first positive lens, and closer to the object side than to the surface apex on the image side of the first positive lens, which results in that the position of the aperture stop overlaps the position of the first positive lens in the optical axis direction.

Preferably, in the zoom lens described above, the third lens group is made as a focus lens group composed of one sheet of positive lens made of a resin, and fulfills a conditional expression (11):

$$0.045 < p3 < 0.06 \quad (11)$$

where p3 is a refractive power of the third lens group.

The third lens group is made as the focus lens group composed of the positive lens made of the resin, and fulfills the conditional expression (11), which results in that the chromatic aberration of magnification in the telescopic end becomes small, and an amount of movement of the third lens group becomes small.

Preferably, in the zoom lens described above, a conditional expression (12) is fulfilled:

$$0.2 < (L1G+L2G+L3G)/\{(Lt+Lw)/2\} < 0.3 \quad (12)$$

The conditional expression (12) described above is fulfilled, which results in that the balance between the optical total length and the thicknesses of the first to third lens groups is maintained.

According to another embodiment of the present invention, there is provided an imaging apparatus including: a zoom lens; and an imaging element transforming an optical image formed by the zoom lens into an electrical signal, in which in the zoom lens, a first lens group having a negative refractive power, a second lens group having a positive refractive power, and a third lens group having the positive refractive power are disposed in order from an object side to an image side; in a phase of variable magnification from a wide-angle end to a telescopic end, the first lens group is moved and the second lens group is moved to the object side in such a way that an air interval between the first lens group and the second lens group is decreased and an air interval between the second lens group and the third lens group is increased; the first lens group is constructed in such a way that a negative lens whose both surfaces are formed in aspherical surfaces, respectively, and whose concave surface is directed to the image side, and a positive meniscus lens whose both surfaces are formed in spherical surfaces, respectively, and whose convex surface is directed to the object side are disposed in order from the object side to the image side; a fixed aperture stop is disposed in a vicinity of the second lens group; and conditional expressions (1) to (8) are fulfilled:

$$\nu 12 < 20; \quad (1)$$

$$n12 > 1.95; \quad (2)$$

$$(L11 \sim L12)/Lt < 0.07; \quad (3)$$

$$Lt/ft < 1.65; \quad (4)$$

$$0.9 < Lt/Lw < 1.1; \quad (5)$$

$$\beta 2t/\beta 2w > 4.3; \quad (6)$$

$$L2Gtw/\{(Lt+Lw)/2\} > 0.45; \text{ and} \quad (7)$$

$$(L1G+L2G+L3G)/\{\alpha \cdot (ft \cdot fw)^{1/2}\} < 0.2 \quad (8)$$

where ν12 is an Abbe's number of the positive meniscus lens of the first lens group, n12 is a refractive index in a d line of the positive meniscus lens of the first lens group, L11~L12 is an air interval from a surface apex on the image side of the negative lens of the first lens group to a surface apex on the object side of the positive meniscus lens of the first lens group, Lt is a distance from the surface apex on the object side of the negative lens of the first lens group to an image capturing surface in the telescopic end, ft is a focal length of an entire lens system in the telescopic end, Lw is a distance from the surface apex on the object side of the negative lens of the first lens group to the image capturing surface in the telescopic end, $\beta 2t$ is a transverse magnification of the second lens group in the wide-angle end, $\beta 2w$ is a transverse magnification of the second lens group in the wide-angle end, L2Gtw is an amount of movement of the second lens group in the phase of the variable magnification from the wide-angle end to the telescopic end, L1G is a distance from the surface apex on the object side to the surface apex on the image side of the first lens group, L2G is a distance from the surface apex on the object side to the surface apex on the image side of the second lens group, L3G is a distance from the surface apex on the object side to the surface apex on the image side of the third lens group, $\alpha$ is a variable magnification ratio, and fw is a focal length of the entire lens system in the wide-angle end.

Therefore, in the imaging apparatus, the increased variable magnification is carried out after the optical total length of the zoom lens is shortened.

As set forth hereinabove, according to the present disclosure, the miniaturization and the increased variable magnification can be realized for the zoom lens and the imaging apparatus. In particular, it is possible to realize the increased variable magnification in which the variable magnification ratio is equal to or larger than 4.5.

DETAILED DESCRIPTION OF THE PREFERRED EMBODIMENTS

Figure 1:
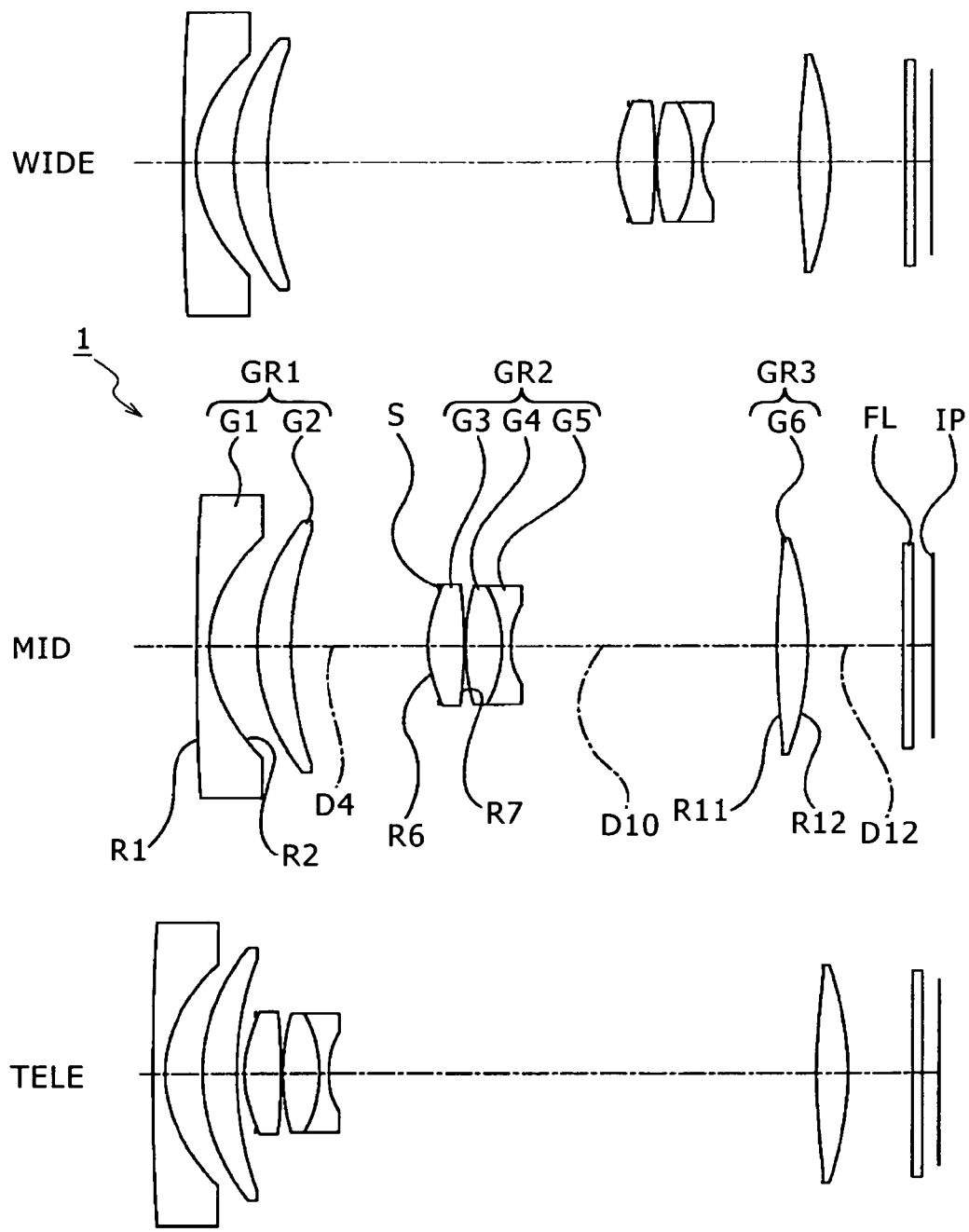
FIG. 1 is a view showing a lens construction of a zoom lens according to a first embodiment of the present disclosure.

A zoom lens and an imaging apparatus according to embodiments of the present disclosure will be described in detail hereinafter with reference to the accompanying drawings.

Construction of Zoom Lens

The zoom lens according to an embodiment of the present disclosure is constructed in such a way that a first lens group having a negative refractive power, a second lens group having a positive refractive power, and a third lens group having the positive refractive power are disposed from an object side to an image side in order.

In addition, in the zoom lens according to the embodiment of the present disclosure, in a phase of variable magnification from a wide-angle end to a telescopic end, the first lens group is moved and the second lens group is moved to the object side in such a way that an air interval between the first lens group and the second lens group is decreased, and an air interval between the second lens group and the third lens group is increased.

In addition, in the zoom lens according to the embodiment of the present disclosure, the first lens group is constructed in such a way that a negative lens whose both surfaces are formed in aspherical surfaces, respectively, and whose concave surface is directed to the image side, and a positive meniscus lens whose both surfaces are formed in spherical surfaces, respectively, and whose convex surface is directed to the object side are disposed in order from the object side to the image side. Also, a fixed aperture stop is disposed in the vicinity of the second lens group.

In addition thereto, the zoom lens according to the embodiment of the present disclosure fulfills the conditional expressions (1) to (8):

$$\nu 12 < 20; \tag{1}$$

$$n12 > 1.95; \tag{2}$$

$$(L11 \sim L12)/Lt < 0.07; \tag{3}$$

$$Lt/ft < 1.65; \tag{4}$$

$$0.9 < Lt/Lw < 1.1; \tag{5}$$

$$\beta 2t/\beta 2w > 4.3; \tag{6}$$

$$L2Gtw/\{(Lt+Lw)/2\} > 0.45; \text{ and} \tag{7}$$

$$(L1G+L2G+L3G)/\{\alpha \cdot (ft \cdot fw)^{1/2}\} < 0.2 \tag{8}$$

where $\nu 12$ is an Abbe's number of the positive meniscus lens of the first lens group, $n12$ is a refractive index in a d line of the positive meniscus lens of the first lens group, L11~L12 is an air interval from a surface apex on the image side of the negative lens of the first lens group to a surface apex on the object side of the negative lens of the positive meniscus lens of the first lens group, Lt is a distance from the surface apex on the object side of the first lens group to an image capturing surface in the telescopic end, ft is a focal length of an entire lens system in the telescopic end, Lw is a distance from the surface apex on the object side of the negative lens of the first lens group to the image capturing surface in the wide-angle end, β2t is a transverse magnification of the second lens group in the telescopic end, β2w is a transverse magnification of the second lens group in the wide-angle end, L2Gtw is an amount of movement of the second lens group in the phase of the variable magnification from the wide-angle end to the telescopic end, L1G is a distance from the surface apex on the object side to the surface apex on the image side of the first lens group, L2G is a distance from the surface apex on the object side to the surface apex on the image side of the second lens group, L3G is a distance from the surface apex on the object side to the surface apex on the image side of the third lens group, α is a variable magnification ratio, and fw is a focal length of the entire lens system in the wide-angle end.

The conditional expression (1) is an expression for regulating the Abbe's number of the positive meniscus lens of the first lens group.

When an upper limit of the conditional expression (1) is exceeded, an axial chromatic aberration in the telescopic end becomes deteriorated. Thus, for the purpose of correcting the axial chromatic aberration in the telescopic end, the refractive powers of the negative lens and the positive meniscus lens of the first lens group need to be weakened to increase the air interval between the negative lens and the positive meniscus lens of the first lens group. However, when the refractive powers of the negative lens and the positive meniscus lens of the first lens group is weakened to increase the air interval between the negative lens and the positive meniscus lens of the first lens group, a thickness of the first lens group is increased, which disturbs the miniaturization of the zoom lens.

Therefore, the zoom lens fulfills the conditional expression (1), whereby the axial chromatic aberration in the telescopic end can be prevented from becoming deteriorated, thereby miniaturizing the zoom lens.

The conditional expression (2) is an expression for regulating the refractive index in the d line of the positive meniscus lens of the first lens group.

When the refractive index, n12, in the d line of the positive meniscus lens of the first lens group falls below a lower limit of 1.95 in the refractive index, n12, in the d line of the positive meniscus lens of the first lens group, it becomes difficult to correct the spherical aberration in the telescopic end while an air interval between the negative lens and the positive meniscus lens of the first lens group is shortened.

Therefore, the zoom lens fulfills the conditional expression (2), whereby the spherical aberration in the telescopic end can be satisfactorily corrected while the thickness of the first lens group is decreased. The conditional expression (3) is an expression for regulating a ratio of the air interval from the surface apex on the image side of the negative lens of the first lens group to the surface apex on the object side of the positive meniscus of the first lens group to the distance from the surface apex on the object side of the negative lens of the first lens group to the image capturing surface in the telescopic end.

Although the zoom lens is used as a collapsible mount type optical system in some cases, in such cases, when the increased variable magnification is desired to be realized, the optical total length in the telescopic end is easy to be longer than that in the wide-angle end. Thus, the thickness in the phase of the storage of the zoom lens exerts a large influence together with the thicknesses of the first to third lens groups, especially, the thickness of the first lens group on the optical total length in the telescopic end. Therefore, for the purpose of shortening the optical total length in the phase of the storage of the zoom lens, there is required the satisfactory balance between the optical total length in the telescopic end and the thickness of the first lens group.

Then, the zoom lens fulfills the conditional expression (3), which results in that it is possible to shorten the distance between the negative lens of the first lens group and the second lens group in the telescopic end, and thus it is possible to achieve a balance between the increased variable magnification and the shortening of the optical total length in the telescopic end. In addition, the thickness of the first lens group is decreased, and thus it is possible to achieve a balance between the shortening of the optical total length and the increased variable magnification in the phase of the storage of the zoom lens.

The conditional expression (4) is an expression for regulating a ratio of the distance from the surface apex on the object side of the negative lens of the first lens group to the image capturing surface in the telescopic end to the focal length of the entire lens system in the telescopic end.

Although when the increased variable magnification is desired to be realized, the optical total length is easy to be long, when the optical total length becomes long, it may be impossible to realize the miniaturization.

Then, the zoom lens fulfills the conditional expression (4), thereby making it possible to achieve a balance between the increased variable magnification and the miniaturization.

The conditional expression (5) is an expression for regulating a ratio of the distance from the surface apex on the object side of the negative lens of the first lens group to the image capturing surface in the telescopic end to the distance from the surface apex on the negative lens of the first lens group to the image capturing surface in the wide-angle end.

In the zoom lens according to the embodiment of the present disclosure, the fixed aperture stop is disposed in the vicinity of the second lens group. Therefore, when the optical total length in the telescopic end becomes too long relative to the optical total length in the wide-angle end, an F-number in the telescopic end becomes too dark. On the other hand, when the optical total length in the telescopic end becomes too short relative to the optical total length in the wide-angle end, the F-number in the wide-angle end becomes too bright.

Then, the zoom lens fulfills the conditional expression (5), which results in that the F-number in the telescopic end does not become extremely dark, and also the F-number in the wide-angle end does not become extremely bright. As a result, both of the miniaturization and the high performance can be realized.

The conditional expression (6) is an expression for regulating a ratio of the transverse magnification of the second lens group in the telescopic end to the transverse magnification of the second lens group in the wide-angle end.

In the zoom lens according to the embodiment of the present disclosure, an amount of movement of the second lens group is set larger than that of any of the first and third lens groups. Thus, an amount of movement of the second lens group exerts a large influence on the variable magnification.

Then, the zoom lens fulfills the conditional expression (6), which results in that an amount of movement of the second lens group in the phase of the variable magnification can be suitably set for the optical total length, and both of the miniaturization and the increased variable magnification can be realized.

The conditional expression (7) is an expression for regulating a relationship between an amount of movement of the second lens group and the thickness of the negative lens of the first lens group.

In the zoom lens according to the embodiment of the present disclosure, an amount of movement of the second lens group is set larger than that of any of the first and third lens groups. Thus, an amount of movement of the second lens group exerts a large influence on the variable magnification.

Then, the zoom lens fulfills the conditional expression (7), which results in that an amount of movement of the second lens group in the phase of the variable magnification can be suitably set for the optical total length, and both of the miniaturization and the increased variable magnification can be realized.

The conditional expression (8) is an expression for regulating a ratio of the thicknesses of the first to third lens groups to the focal length of the entire lens system in the wide-angle end.

When an upper limit of the conditional expression (8) is exceeded, the thickness in the phase of the storage of the zoom lens becomes too large, and also it becomes difficult to ensure the high variable magnification ratio.

Then, the zoom lens fulfills the conditional expression (8), which results in that both of the increased variable magnification and the miniaturization can be realized. In particular, it becomes possible to carry out the satisfactory aberration correction, and it becomes possible to shorten the optical total length in the phase of the storage of the zoom lens.

In the zoom lens according to an embodiment of the present disclosure, preferably, the lens group is constructed in such a way that at least a first positive lens whose surface on the object side is formed in an aspherical surface, and a cemented lens obtained by joining a second positive lens and a negative lens to each other are disposed in order from the object side to the image side, and conditional expressions (9) and (10) are fulfilled:

$$v21>60; \text{ and} \tag{9}$$

$$(L21\sim L23)/ft<0.18 \tag{10}$$

where $v21$ is an Abbe's number of the positive lens of the second lens group, and $L21\sim L23$ is a distance from a surface apex on the object side of the first positive lens of the second lens group to a surface apex on the image side of the cemented lens.

The second lens group is composed of at least the first positive lens whose surface on the object side is formed in the aspherical surface, and the cemented lens obtained by joining the second positive lens and the negative lens to each other, which results in that both of the spherical aberration and the chromatic aberration can be satisfactorily corrected while the second lens group is given the strong positive refractive power. In addition, since a front side principal point of the second lens group can be located on the object side, it is possible to shorten the optical total length. In addition, the thickness of the cemented lens can be decreased while the second lens group is given the strong positive refractive power, and the cost can be further suppressed in this case than in the case where the aspherical surfaces are disposed on the both surfaces of the cemented lens, respectively, as compared with the case of the construction that the cemented lens obtained by joining the positive lens and the negative lens to each other, and the positive lens are disposed in order from the object side to the image side. Therefore, it is possible to realize the thinning of the second lens group, the shortening of the optical total length, and the reduction of the manufacturing cost.

The conditional expression (9) is an expression for regulating the Abbe's number of the first positive lens of the second lens group.

The zoom lens fulfills the conditional expression (9), which results in that the chromatic aberration can be satisfactorily corrected while the second lens group is given the strong positive refractive power.

The conditional expression (10) is an expression for regulating a ratio of the distance from the surface apex on the object side of the first positive lens of the second lens group to the surface apex on the image side of the cemented lens to the focal length of the entire lens system in the telescopic end.

The lens fulfills the conditional expression (10), which results in that it is possible to realize the high variable magnification and it is also possible to shorten the optical total length in the phase of the storage of the zoom lens.

In the zoom lens according to an embodiment of the present disclosure, preferably, the first positive lens is a lens whose convex surface is directed to the object side, and the aperture stop is disposed closer to the image side than to the surface apex on the object side of the first positive lens, and closer to the object side than to the surface apex on the image side of the first positive lens.

The aperture stop is disposed closer to the image side than to the surface apex on the object side of the first positive lens, and closer to the object side than to the surface apex on the image side of the first positive lens, which results in that the position of the aperture stop overlaps the position of the first positive lens in the optical axis direction, and thus the zoom lens can be miniaturized.

In the zoom lens according to an embodiment of the present disclosure, preferably, the third lens group is made as a focus lens group composed of one sheet of positive lens made of a resin, and fulfills a conditional expression (11):

$$0.045<p3<0.06 \tag{11}$$

where $p3$ is a refractive power of the third lens group.

The conditional expression (11) is an expression for regulating the refractive power of the third lens group.

When the refractive power, $p3$, of the third lens group exceeds an upper limit of 0.06 in the conditional expression (11), the refractive power of the third lens group becomes too large, and thus the chromatic aberration of the magnification in the telescopic end becomes large.

Contrary to this, when the refractive power, $p3$, of the third lens group falls below a lower limit of 0.045 in the conditional expression (11), the refractive power of the third lens group becomes too small, and thus an amount of movement of the third lens group as the focus lens group becomes large. In particular, when the high variable magnification is desired to be realized, an amount of movement of the third lens group becomes larger.

Therefore, the zoom lens fulfills the conditional expression (11), which results in that an amount of movement of the third lens group when defocusing due to a single part error and an assembly error of each of the parts is corrected can be reduced while the chromatic aberration of magnification in the telescopic end is suppressed, thereby realizing the miniaturization.

In a zoom lens according to an embodiment of the present disclosure, preferably, a conditional expression (12) is fulfilled:

$$0.2<(L1G+L2G+L3G)/\{(Lt+Lw)/2\}<0.3 \tag{12}$$

The conditional expression (12) is an expression for showing a relationship between the thickness of the lens groups and the thickness of the negative lens of the first lens group.

Although the zoom lens is used as the collapsible mount type optical system in some cases, in such cases, even when any of the optical total length in the telescopic end, and the optical total length in the wide-angle end is too long, it may be impossible to shorten the optical total length in the phase of the storage of the zoom lens. Therefore, it is necessary to achieve a balance between the optical total length and the thicknesses of the first to third lens groups.

Then, the zoom lens fulfills the conditional expression (12), which results in that a balance between the optical total length and the thicknesses of the first to third lens groups is maintained, and thus it is possible to realize the shortening of the optical total length in the phase of the storage of the zoom lens, and the high performance of the zoom lens.

It is noted that in the zoom lens, of the first to third lens groups, either one lens group or a part of one lens group is shifted in a direction approximately vertical to the optical axis, thereby making it possible to shift the image.

In such a way, a detection system and a control system are combined with each other, which results in that the zoom lens can be made to function as an anti-vibration optical system as well. In this case, the detection system moves either the lens group or a part of the lens group is shifted in the direction approximately vertical to the optical axis, thereby detecting the image blurring. Also, the control system gives an amount of shift to a drive system in accordance with the output from the drive system for shifting the first to third lens groups, and the output from the detection system. In particular, in the zoom lens according to the embodiment of the present disclosure, the entire second lens group is shifted in the direction approximately vertical to the optical axis, which results in that the image can be shifted with the less aberration variation.

In addition, in the zoom lens according to the embodiment of the present invention, preferably, either the first lens group or the third lens group is moved in the optical axis direction, thereby carrying out the focusing. In particular, the third lens group is used as the lens group for the focusing, which results in that it is easy to avoid an interference with the drive system for driving and controlling a shutter unit and an iris unit, and the anti-vibration drive system for shifting the lens group(s), and thus the miniaturization can be realized.

Zoom Lenses of First to Third Embodiments

Hereinafter, zoom lenses according to first to third embodiments of the present disclosure, and numerical examples which are obtained by applying concrete numerical values to the zoom lenses according to the first to third embodiments of the present disclosure will be described in detail with reference to the accompanying drawings and TABLES 1 to 13.

It is noted that meanings or the like of symbols which will be shown hereinafter in TABLES 1 to 13 and the descriptions are as follows.

"A surface number" represents an i-th surface counted from the object side to the image side, and "R" represents a radius of curvature of the i-th surface. "D" represents an axial surface interval between the i-th surface and an (i+1)-th surface (a lens central thickness or an air interval), and "nd" represents a refractive index in a d line ($\lambda$=587.6 nm) of a lens or the like beginning with the i-th surface. Also, "vd" represents an Abbe's number in the d line of the lens or the like beginning with the i-th surface.

With regard to "the surface number," "ASP" represents that the surface concerned is an aspherical surface. With regard to "the radius, R, of curvature," "∞" represents that the surface concerned is a flat surface. Also, with regard to "the surface interval D," "variable" represents a variable interval.

"K" represents a conic constant, and "A4," "A6," "A8," and "A10" represent 4-order, 6-order, 8-order, and 10-order aspherical surface coefficients, respectively.

"f" represents' a focal length of a lens entire system, "fno" represents an F-number (open F value), and "ω" represents a half field angle.

It is noted that in the following TABLES 1 to 13 showing the aspherical surface coefficients, "E-n" represents an exponential expression with 10 as the base, that is, "$10^{-n}$." For example, "0.12345E-05" represents "$0.12345 \times 10^{-5}$."

In some zoom lenses used in the first to third embodiments, a lens surface is formed in the form of an aspherical surface. The aspherical surface shape is defined by Expression (1):

$$x = \frac{cy^2}{1+\{1-(1+K)c^2y^2\}^{1/2}} + \Sigma A i y^j \tag{1}$$

where x is a distance in an optical axis direction from the apex of a lens surface, y is a height in a direction orthogonal to the optical axis direction, and c is a paraxial radius of curvature in the lens apex.

Zoom Lens of First Embodiment

FIG. 1 shows a lens construction of a zoom lens 1 according to a first embodiment of the present disclosure.

In the zoom lens 1, a variable magnification ratio is set to a magnification of 4.71.

The zoom lens 1 is constructed in such a way that a first lens group GR1 having a negative refractive power, a second lens group GR2 having a positive refractive power, and a third lens group GR3 having a positive refractive power are disposed in order from an object side to an image side.

In the zoom lens 1, in a phase of variable magnification from a wide-angle end to a telescopic end, the first lens group GR1 is moved and the second lens group GR2 is moved to the object side in such a way that an air interval between the first lens group GR1 and the second lens group GR2 is decreased, and an air interval between the second lens group GR2 and the third lens group GR3 is increased.

The first lens group GR1 is constructed in such a way that a negative lens G1 whose both surfaces are formed in aspherical surfaces, respectively, and whose concave surface is directed to the image side, and a positive meniscus lens G2 whose convex surface is directed to the object side are disposed in order from the object side to the image side.

The second lens group GR2 is constructed in such a way that a first positive lens G3 whose both surfaces are formed in aspherical surfaces, respectively, and which has a biconcave shape, and a cemented lens obtained by joining a second positive lens G4 having a biconvex shape, and a negative lens G5 having a biconcave shape to each other are disposed in order from the object side to the image side.

It is noted that in the first positive lens G3 of the second lens group GR2, only the surface on the object side may be formed in aspherical surface.

The third lens group GR3 is composed of a positive lens G6 whose both surfaces are formed in aspherical surfaces, respectively, which has a biconvex shape, and which is made of a resin. The third lens group GR3 is made as a focus lens group.

An aperture stop S is fixed to the vicinity of the second lens group GR2. The aperture stop S is disposed closer to the image side than to the surface apex on the object side of the first positive lens G3 of the second lens group GR2, and closer to the object side than to the surface apex on the image side of the first positive lens G4.

A filter FL is disposed between the third lens group GR3 and the image surface IP.

TABLE 1 shows lens data in Numerical Example 1 in which concrete numerical values are applied to the zoom lens 1 of the first embodiment.

TABLE 1

| Surface number | R | D | nd | νd |
|---|---|---|---|---|
| 1 (ASP) | 82.0042 | 0.600 | 1.85130 | 40.10 |
| 2 (ASP) | 5.8370 | 1.605 | | |
| 3 | 8.9453 | 1.51 | 2.00270 | 19.32 |
| 4 | 15.5892 | Variable | | |
| Aperture stop | ∞ | −0.43 | | |
| 6 (ASP) | 5.6062 | 1.600 | 1.59200 | 67.02 |
| 7 (ASP) | −23.3216 | 0.100 | | |
| 8 | 10.4384 | 1.560 | 1.88300 | 40.80 |
| 9 | −6.1300 | 0.430 | 1.68890 | 31.16 |
| 10 | 3.6676 | Variable | | |
| 11 (ASP) | 49.6357 | 1.420 | 1.52470 | 56.24 |
| 12 (ASP) | −12.0103 | Variable | | |
| 13 | ∞ | 0.240 | 1.51680 | 64.20 |
| 14 | ∞ | 0.400 | | |
| IMG | ∞ | 0.790 | | |

In the zoom lens 1, both of surfaces (first surface and second surface) of the negative lens G1 of the first lens group GR1, both of surfaces (sixth surface and seventh surface) of the first positive lens G3 of the second lens group GR2, and both of surfaces (eleventh surface and twelfth surface) of the positive lens G6 of the third lens group GR3 are all formed in aspherical surfaces, respectively. TABLE 2 shows the 4-order, b-order, 8-order, and 10-order aspherical surface coefficients A4, A6, A8, and A10 of the aspherical surface in Numerical Example 1 together with the conic constant K.

TABLE 2

| Surface number | K | A4 | A6 | A8 | A10 |
|---|---|---|---|---|---|
| 1 | 0.00000E+00 | −6.16380E−04 | 3.30000E−05 | −1.00000E−06 | 6.04352E−09 |
| 2 | 0.00000E+00 | −1.00876E−03 | 2.40000E−05 | 7.36606E−08 | −2.75830E−08 |
| 6 | 0.00000E+00 | −6.22059E−04 | −1.29000E−04 | 1.70000E−05 | −1.00000E−06 |
| 7 | 0.00000E+00 | 8.86744E−04 | −1.08680E−04 | 1.80000E−05 | −1.00000E−06 |
| 11 | 0.00000E+00 | 6.43341E−04 | −8.60000E−05 | 5.00000E−06 | −1.03340E−07 |
| 12 | 0.00000E+00 | 1.33487E−03 | −1.32042E−04 | 7.00000E−06 | −1.34039E−07 |

TABLE 3 shows the F-number fno, and the half field angle ω in the wide-angle end state (f=4.84), the intermediate focal length state (f=10.52), and the telescopic end state (f=22.80) in Numerical Example 1.

TABLE 3

| | WIDE | MID | TELE |
|---|---|---|---|
| f | 4.84 | 10.52 | 22.80 |
| fno | 2.64 | 3.81 | 6.49 |
| ω | 38.76 | 20.28 | 9.67 |

In the zoom lens 1, a surface interval, D4, between the first lens group GR1 and the second lens group GR2, a surface interval, D10, between the second lens group GR2 and the third lens group GR3, and a surface interval D12 between the third lens group GR3 and the filter FL are changed during the zooming between the wide-angle end state and the telescopic end state. TABLE 4 shows surface intervals in the wide-angle end state (f=4.84), the intermediate focal length state (f=10.52), and the telescopic end state (f=22.80) in the surface intervals in Numerical Example 1.

TABLE 4

| | WIDE | MID | TELE |
|---|---|---|---|
| D4 | 16.161 | 5.460 | 0.830 |
| D10 | 4.718 | 9.877 | 15.136 |
| D12 | 3.585 | 2.933 | 2.020 |

Figure 2:
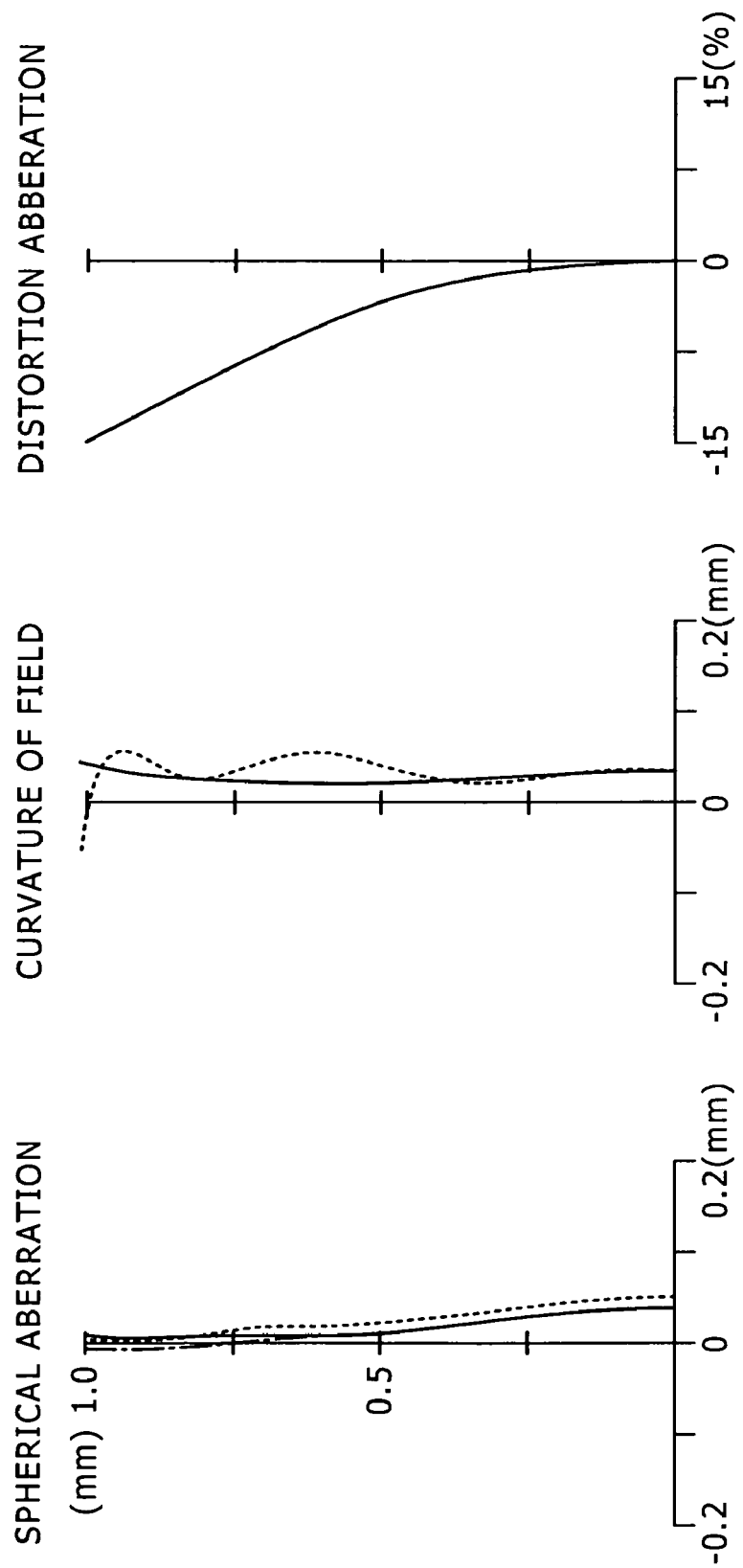
FIG. 2 is an aberration view of a numerical example in which concrete numerical values are applied to the zoom lens of the first embodiment together with FIGS. 3 and 4, and is also a view showing a spherical aberration, a curvature of field, and a distortion aberration in a wide-angle end state.
Figure 3:
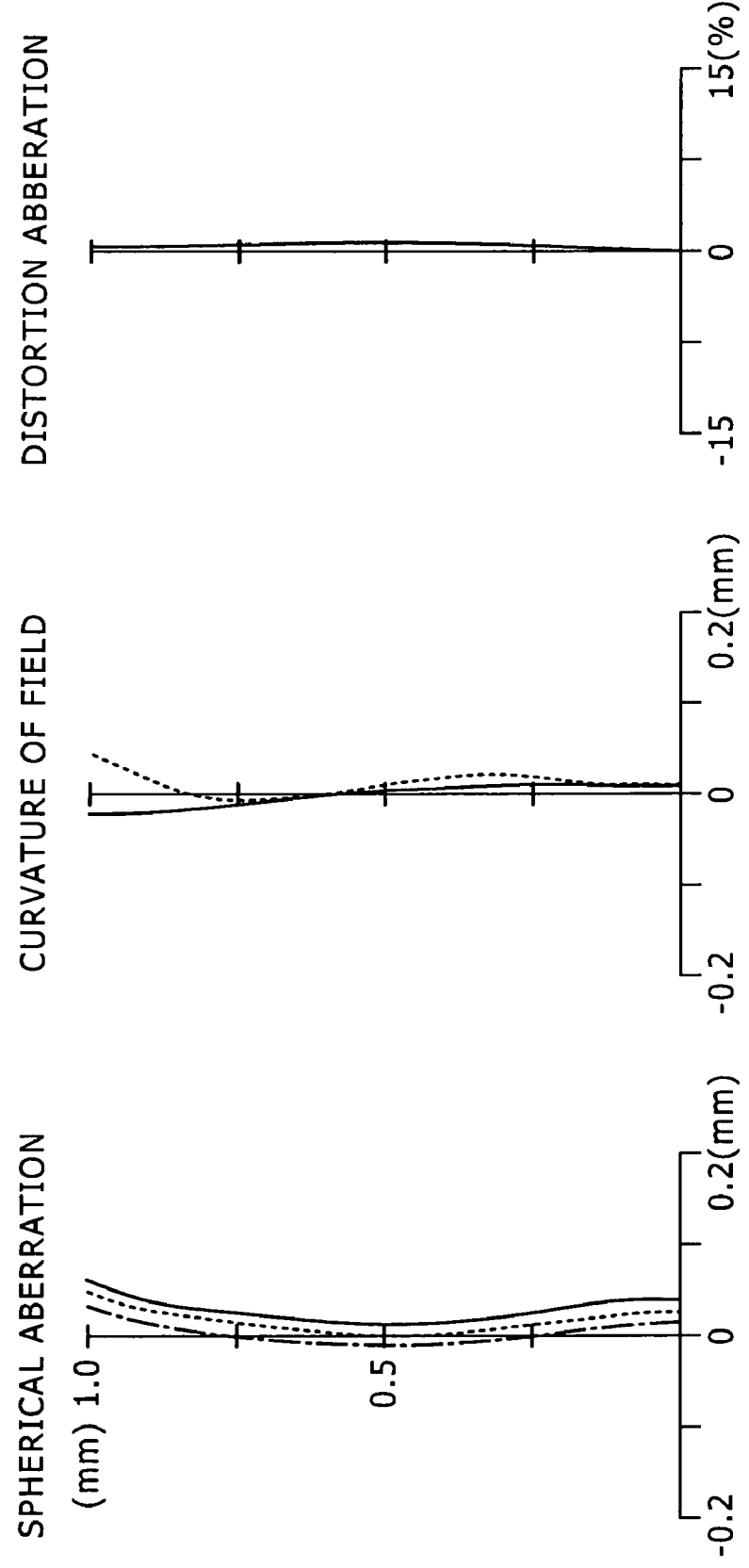
FIG. 3 is a view showing a view showing a spherical aberration, a curvature of field, and a distortion aberration in an intermediate focal length state.
Figure 4:
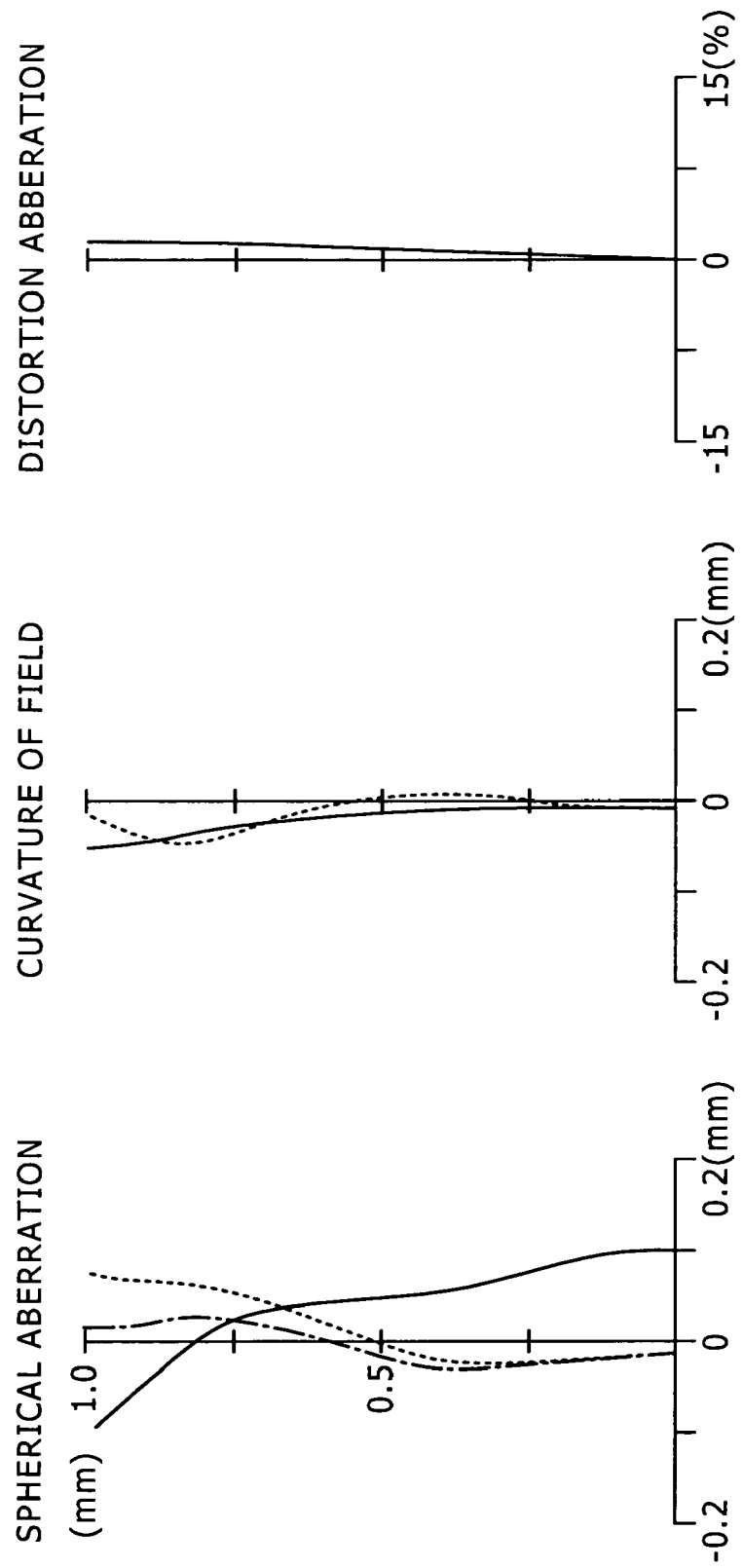
FIG. 4 is a view showing a view showing a spherical aberration, a curvature of field, and a distortion aberration in a telescopic end state.

FIGS. 2 to 4 show aberration views in an infinity focusing state in Numerical Example 1. FIG. 2 shows a spherical aberration view, a view of a curvature of field, and a distortion aberration view in the wide-angle end state. FIG. 3 shows a spherical aberration view, a view of a curvature of field, and a distortion aberration view in the intermediate focal length state. Also, FIG. 4 shows a spherical aberration view, a view of a curvature of field, and a distortion aberration view in the telescopic end state.

FIGS. 2 to 4 show values in a d line (wavelength: 587.6 nm) indicated by a solid line, a g line (wavelength: 435.8 nm) indicated by a chain line, and a c line (wavelength: 656.3 nm) indicated by a dotted line in the spherical aberration views, respectively. Also, in each of the views of the curvature of field, values in a sagittal image surface are indicated by a solid line, and values in a meridional image surface are indicated by a dotted line.

It is obvious from the aberration views shown in FIGS. 2 to 4 that the aberrations are satisfactorily corrected in Numerical Example 1, and thus Numerical Example 2 has the superior imaging performance.

Zoom Lens of Second Embodiment

Figure 5:
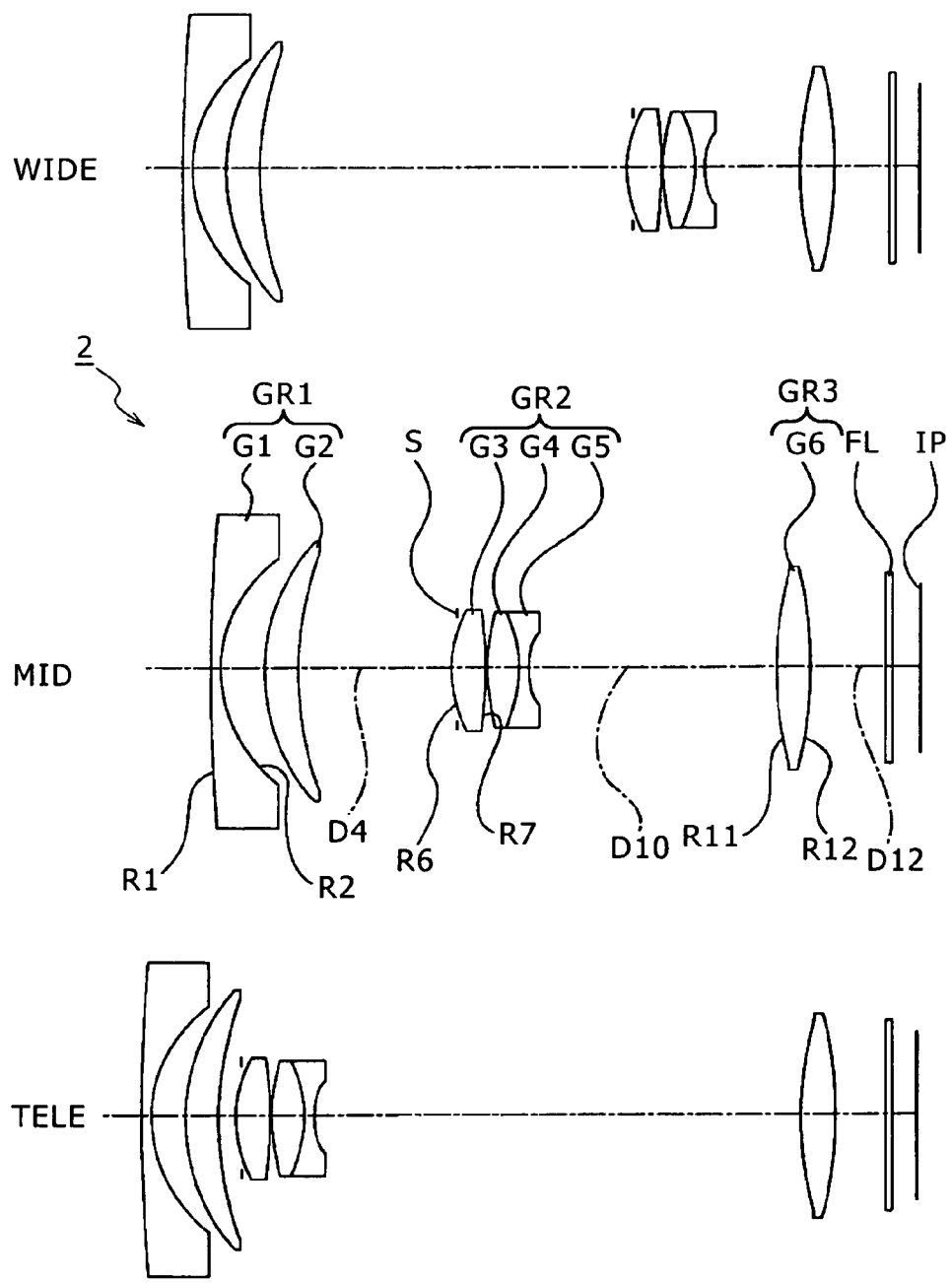
FIG. 5 is a view showing a lens construction of a zoom lens according to a second embodiment of the present disclosure.

FIG. 5 shows a lens construction of a zoom lens 2 according to a second embodiment of the present disclosure.

In the zoom lens 2, a variable magnification ratio is set to 4.70.

The zoom lens 2 is constructed in such a way that a first lens group GR1 having a negative refractive power, a second lens group GR2 having a positive refractive power, and a third lens group GR3 having the positive refractive power are disposed in order from the object side to the image side.

In the zoom lens 2, in the phase of the variable magnification from the wide-angle end to the telescopic end, the first lens group GR1 is moved and the second lens group GR2 is moved to the object side in such a way that an air interval between the first lens group GR1 and the second lens group GR2 is decreased, and an air interval between the second lens group GR2 and the third lens group GR3 is increased.

The first lens group GR1 is constructed in such a way that a negative lens G1 whose both surfaces are formed in aspherical surfaces, respectively, and whose concave surface is directed to the image side, and a positive meniscus lens G2 whose convex surface is directed to the object side are disposed in order from the object side to the image side.

The second lens group GR2 is constructed in such a way that a first positive lens G3 whose both surfaces are formed in aspherical surfaces, respectively, and which has a biconvex shape, and a cemented lens obtained by joining a second positive lens G4 having a biconvex shape, and a negative lens G5 having a biconcave shape to each other are disposed in order from the object side to the image side.

It is noted that in the first positive lens G3 of the second lens group GR2, only the surface on the object side may be formed in aspherical surface.

The third lens group GR3 is composed of a positive lens G6 whose both surfaces are formed in aspherical surfaces, respectively, which has a biconvex shape, and which is made of a resin. The third lens group GR3 is made as a focus lens group.

An aperture stop S is fixed to the vicinity of the second lens group GR2. The aperture stop S is disposed closer to the image side than to the surface apex on the object side of the first positive lens G3 of the second lens group GR2, and closer to the object side than to the surface apex on the image side of the first positive lens G4.

A filter FL is disposed between the third lens group GR3 and the image surface IP.

TABLE 5 shows lens data in Numerical Example 2 in which concrete numerical values are applied to the zoom lens 2 of the second embodiment.

TABLE 5

| Surface number | R | D | nd | vd |
|---|---|---|---|---|
| 1 (ASP) | 105.0000 | 0.400 | 1.85130 | 40.10 |
| 2 (ASP) | 6.1680 | 1.640 | | |
| 3 | 9.5581 | 1.590 | 2.00270 | 19.32 |
| 4 | 17.5328 | Variable | | |
| Aperture stop | ∞ | −0.33 | | |
| 6 (ASP) | 5.8007 | 1.600 | 1.61880 | 63.85 |
| 7 (ASP) | −26.9647 | 0.100 | | |
| 8 | 9.6012 | 1.560 | 1.83480 | 42.72 |
| 9 | −6.3976 | 0.430 | 1.68890 | 31.16 |
| 10 | 3.6997 | Variable | | |
| 11 (ASP) | 21.4017 | 1.650 | 1.52470 | 56.24 |
| 12 (ASP) | −15.3262 | Variable | | |
| 13 | ∞ | 0.300 | 1.51680 | 64.20 |
| 14 | ∞ | 1.130 | | |
| IMG | ∞ | 0.000 | | |

In the zoom lens 2, both of surfaces (first surface and second surface) of the negative lens G1 of the first lens group GR1, both of surfaces (sixth surface and seventh surface) of the first positive lens G3 of the second lens group GR2, and both of surfaces (eleventh surface and twelfth surface) of the positive lens G6 of the third lens group GR3 are all formed in aspherical surfaces, respectively. TABLE 6 shows the 4-order, b-order, 8-order, and 10-order aspherical surface coefficients A4, A6, A8, and A10 of the aspherical surface in Numerical Example 2 together with the conic constant K.

TABLE 6

| Surface number | K | A4 | A6 | A8 | A10 |
|---|---|---|---|---|---|
| 1 | 0.00000E+00 | −4.89851E−04 | 2.80000E−05 | −1.00000E−06 | 4.16628E−09 |
| 2 | 0.00000E+00 | −7.91951E−04 | 1.50000E−05 | 3.96792E−07 | −2.52358E−08 |
| 6 | 0.00000E+00 | −7.48885E−04 | 3.00000E−06 | −7.00000E−06 | 1.00000E−06 |
| 7 | 0.00000E+00 | 4.06412E−04 | 2.70000E−05 | −1.00000E−05 | 1.00000E−06 |
| 11 | 0.00000E+00 | 9.86361E−04 | −1.59648E−04 | 1.20000E−05 | −2.67648E−07 |
| 12 | 0.00000E+00 | 1.88737E−03 | −2.56896E−04 | 1.70000E−05 | −3.91121E−07 |

TABLE 7 shows the F-number fno, and the half field angle ω in the wide-angle end state (f=4.70), the intermediate focal length state (f=10.02), and the telescopic end state (f=22.09) in Numerical Example 2.

TABLE 7

| | WIDE | MID | TELE |
|---|---|---|---|
| f | 4.70 | 10.02 | 22.09 |
| fno | 2.43 | 3.42 | 5.81 |
| ω | 39.58 | 21.18 | 9.97 |

In the zoom lens 2, a surface interval D4 between the first lens group GR1 and the second lens group GR2, a surface interval D10 between the second lens group GR2 and the third lens group GR3, and a surface interval D12 between the third lens group GR3 and the filter FL are changed during the zooming between the wide-angle end state and the telescopic end state. TABLE 8 shows surface intervals in the wide-angle end state (f=4.70), the intermediate focal length state (f=10.02), and the telescopic end state (f=22.09) in the surface intervals in Numerical Example 1.

TABLE 8

| | WIDE | MID | TELE |
|---|---|---|---|
| D4 | 18.113 | 6.171 | 0.830 |
| D10 | 4.718 | 9.877 | 15.136 |
| D12 | 3.585 | 2.933 | 2.020 |

Figure 6:
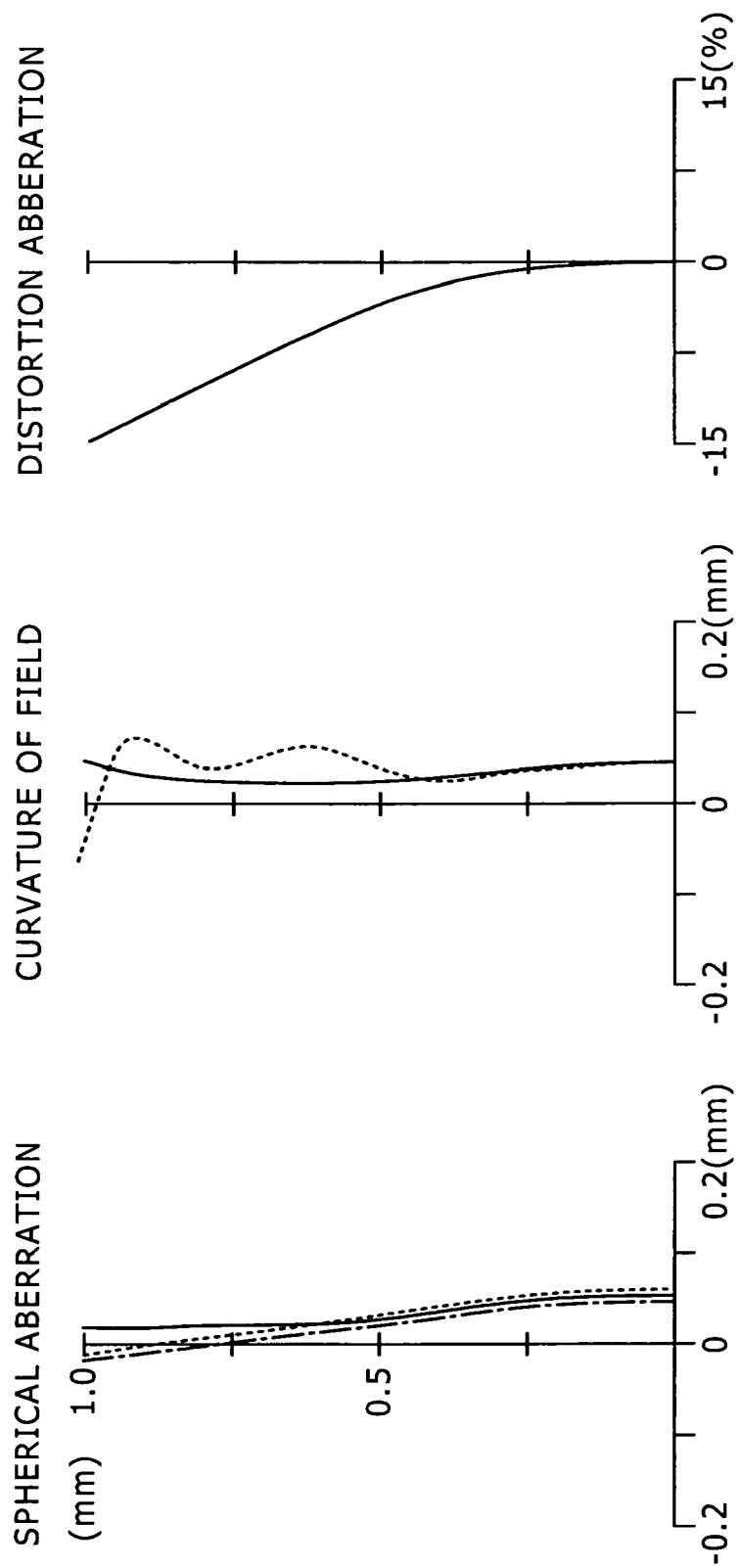
FIG. 6 is an aberration view of a numerical example in which concrete numerical values are applied to the zoom lens of the second embodiment together with FIGS. 7 and 8, and is also a view showing a spherical aberration, a curvature of field, and a distortion aberration in a wide-angle end state.
Figure 7:
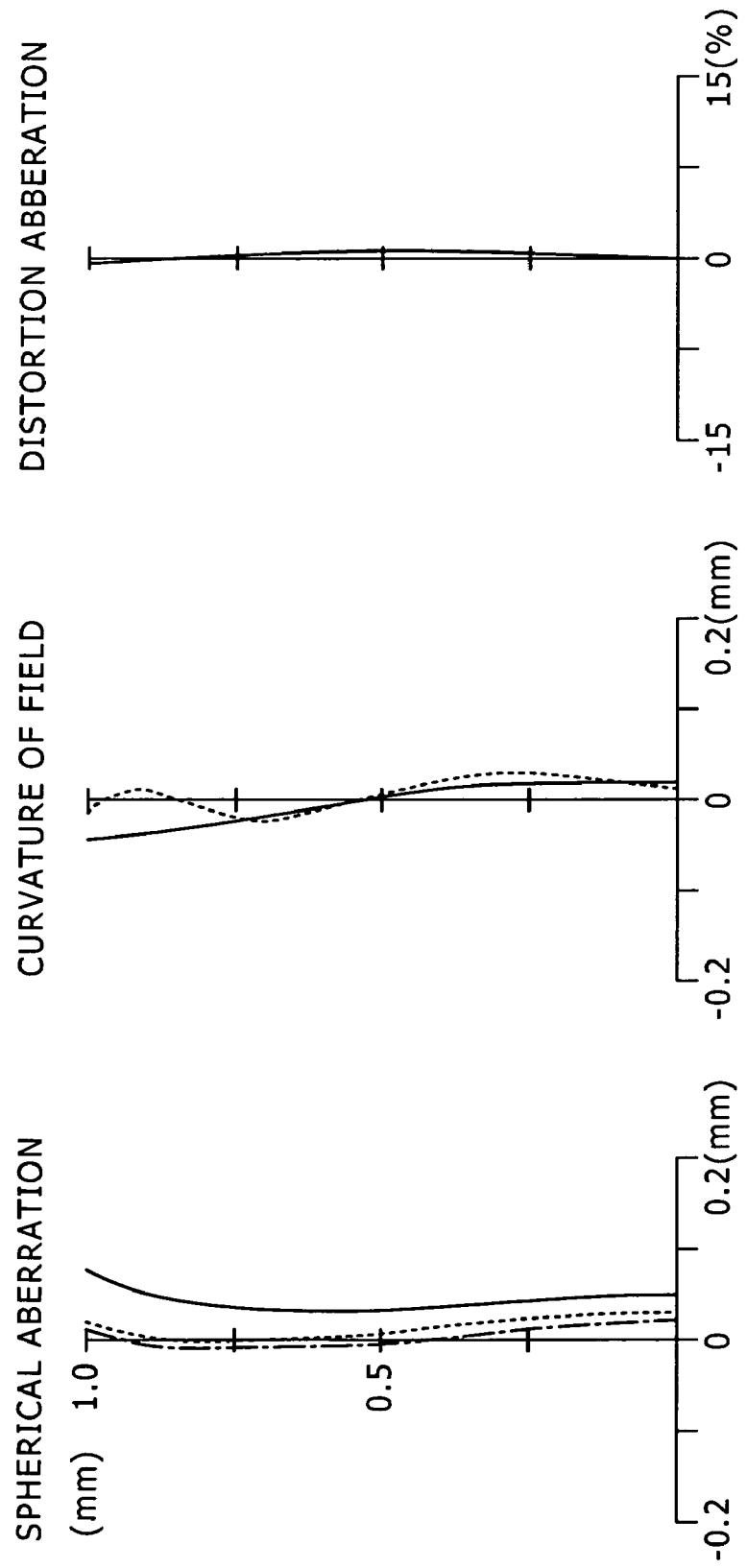
FIG. 7 is a view showing a view showing a spherical aberration, a curvature of field, and a distortion aberration in an intermediate focal length state.
Figure 8:
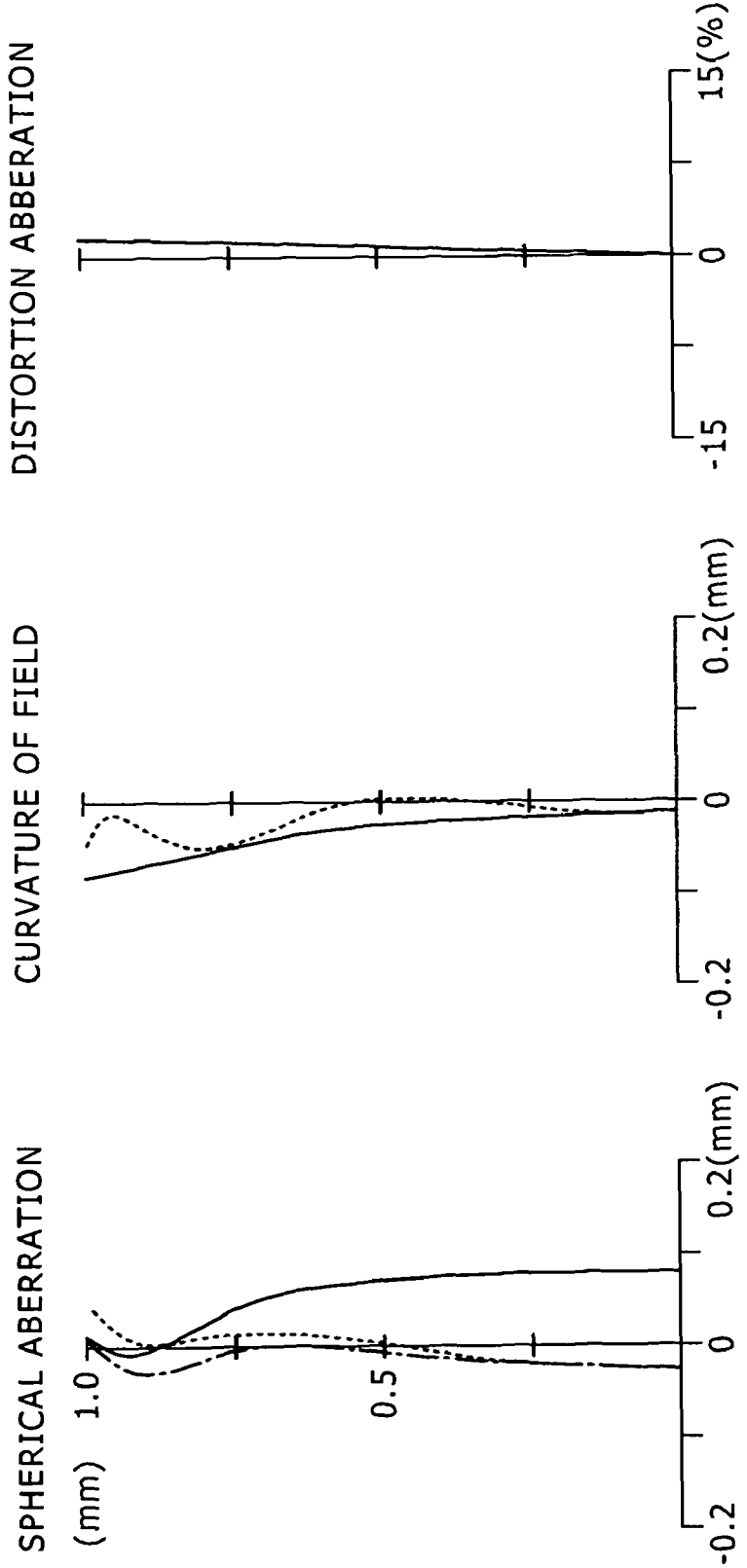
FIG. 8 is a view showing a view showing a spherical aberration, a curvature of field, and a distortion aberration in a telescopic end state.

FIGS. 6 to 8 show aberration views in an infinity focusing state in Numerical Example 2. FIG. 6 shows a spherical aberration view, a view of a curvature of field, and a distortion aberration view in the wide-angle end state. FIG. 7 shows a spherical aberration view, a view of a curvature of field, and a distortion aberration view in the intermediate focal length state. Also, FIG. 8 shows a spherical aberration view, a view of a curvature of field, and a distortion aberration view in the telescopic end state.

FIGS. 6 to 8 show values in a d line (wavelength: 587.6 nm) indicated by a solid line, a g line (wavelength: 435.8 nm) indicated by a chain line, and a c line (wavelength: 656.3 nm) indicated by a dotted line in the spherical aberration views, respectively. Also, in each of the views of the curvature of field, values in a sagittal image surface are indicated by a solid line, and values in a meridional image surface are indicated by a dotted line.

It is obvious from the aberration views shown in FIGS. 6 to 8 that the aberrations are satisfactorily corrected in Numerical Example 2, and thus Numerical Example 2 has the superior imaging performance.

Zoom Lens of Third Embodiment

Figure 9:
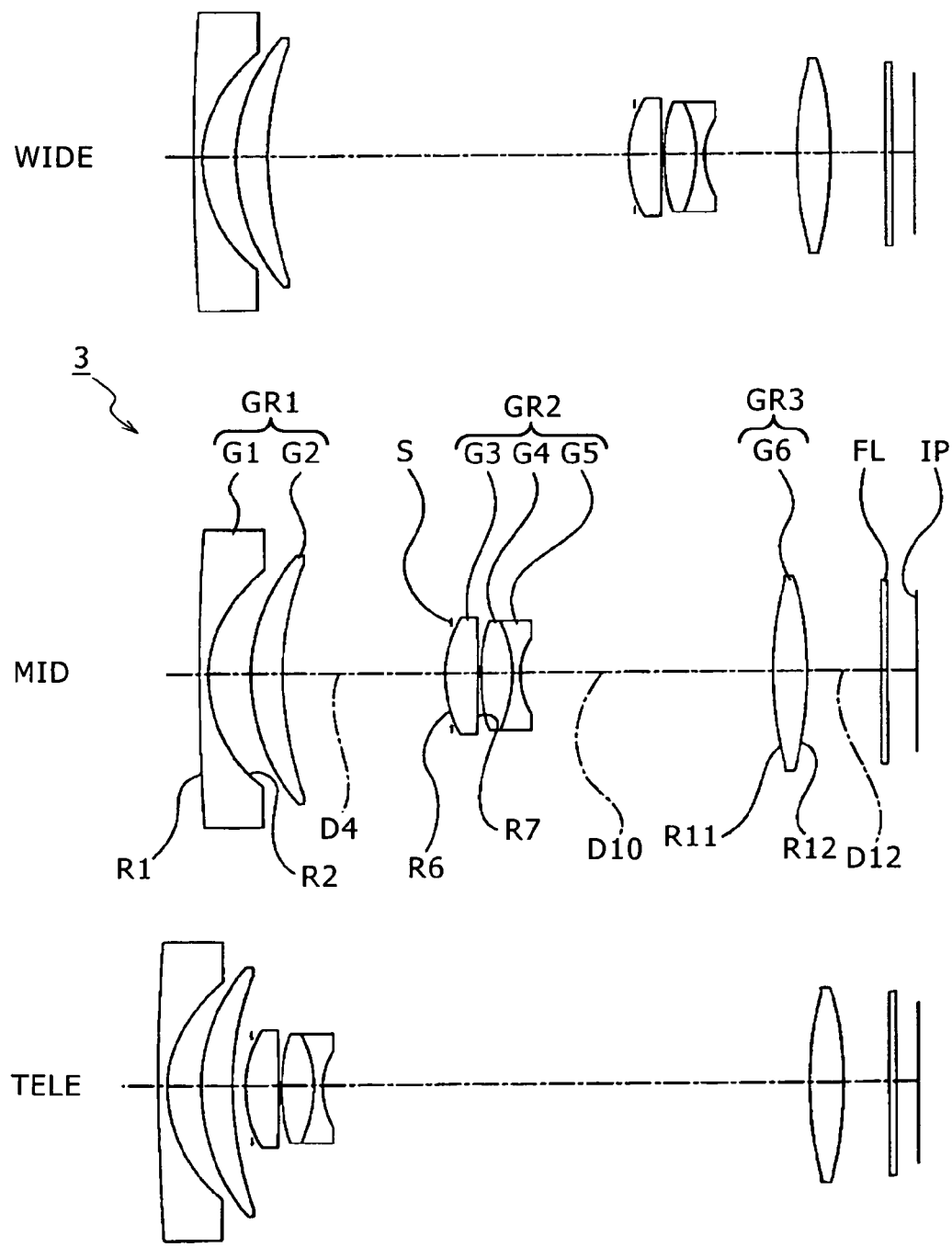
FIG. 9 is a view showing a lens construction of a zoom lens according to a third embodiment of the present disclosure.

FIG. 9 shows a lens construction of a zoom lens 3 according to a third embodiment of the present disclosure.

In the zoom lens 3, a variable magnification ratio is set to 4.90.

The zoom lens 3 is constructed in such a way that a first lens group GR1 having a negative refractive power, a second lens group GR2 having a positive refractive power, and a third lens group GR3 having the positive refractive power are disposed in order from the object side to the image side.

In the zoom lens 3, in the phase of the variable magnification from the wide-angle end to the telescopic end, the first lens group GR1 is moved and the second lens group GR2 is moved to the object side in such a way that an air interval between the first lens group GR1 and the second lens group GR2 is decreased, and an air interval between the second lens group GR2 and the third lens group GR3 is increased.

The first lens group GR1 is constructed in such a way that a negative lens G1 whose both surfaces are formed in aspherical surfaces, respectively, and whose concave surface is directed to the image side, and a positive meniscus lens G2 whose both surfaces are formed in aspherical surfaces, respectively, and whose convex surface is directed to the image side are disposed in order from the object side to the image side.

The second lens group GR2 is constructed in such a way that a first positive lens G3 whose both surfaces are formed in aspherical surfaces, respectively, and which has a biconvex shape, and a cemented lens obtained by joining a second positive lens G4 having a biconvex shape, and a negative lens G5 having a biconcave shape to each other are disposed in order from the object side to the image side.

It is noted that in the first positive lens G3 of the second lens group GR2, only the surface on the object side may be formed in aspherical surface.

The third lens group GR3 is composed of a positive lens G6 whose both surfaces are formed in aspherical surfaces, respectively, which has a biconvex shape, and which is made of a resin. The third lens group GR3 is made as a focus lens group.

An aperture stop S is fixed to the vicinity of the second lens group GR2. The aperture stop S is disposed closer to the image side than to the surface apex on the object side of the first positive lens G3 of the second lens group GR2, and closer to the object side than to the surface apex on the image side of the first positive lens G4.

A filter FL is disposed between the third lens group GR3 and the image surface IP.

TABLE 9 shows lens data in Numerical Example 3 in which concrete numerical values are applied to the zoom lens 3 of the third embodiment.

TABLE 9

| Surface number | R | D | nd | vd |
|---|---|---|---|---|
| 1 (ASP) | 105.0000 | 0.400 | 1.85130 | 40.10 |
| 2 (ASP) | 6.1681 | 1.640 | | |
| 3 | 9.5831 | 1.590 | 2.00270 | 19.32 |

TABLE 9-continued

| Surface number | R | D | nd | vd |
|---|---|---|---|---|
| 4 | 17.5596 | Variable | | |
| Aperture stop | ∞ | −0.33 | | |
| 6 (ASP) | 5.7704 | 1.600 | 1.61880 | 63.85 |
| 7 (ASP) | −31.0543 | 0.100 | | |
| 8 | 9.2743 | 1.560 | 1.83480 | 42.72 |
| 9 | −6.3874 | 0.430 | 1.68890 | 31.16 |
| 10 | 3.6824 | Variable | | |
| 11 (ASP) | 23.4625 | 1.650 | 1.52470 | 56.24 |
| 12 (ASP) | −14.7050 | Variable | | |
| 13 | ∞ | 0.300 | 1.51680 | 64.20 |
| 14 | ∞ | 1.130 | | |
| IMG | ∞ | 0.000 | | |

In the zoom lens 3, both of surfaces (first surface and second surface) of the negative lens G1 of the first lens group GR1, both of surfaces (sixth surface and seven surface) of the first positive lens G3 of the second lens group GR2, and both of surfaces (eleventh surface and twelfth surface) of the positive lens G6 of the third lens group GR3 are all formed in aspherical surfaces, respectively. TABLE 10 shows the 4-order, 6-order, 8-order, and 10-order aspherical surface coefficients A4, A6, A8, and A10 of the aspherical surface in Numerical Example 3 together with the conic constant K.

TABLE 10

| Surface number | K | A4 | A6 | A8 | A10 |
|---|---|---|---|---|---|
| 1 | 0.00000E+00 | −5.01200E−04 | 2.80000E−05 | −1.00000E−06 | 4.33624E−09 |
| 2 | 0.00000E+00 | −8.10528E−04 | 1.60000E−05 | 3.57476E−07 | −2.50053E−08 |
| 6 | 0.00000E+00 | −6.77503E−04 | 2.10000E−05 | −9.00000E−06 | 1.00000E−06 |
| 7 | 0.00000E+00 | 4.75042E−04 | 5.40000E−05 | −1.30000E−05 | 1.00000E−06 |
| 11 | 0.00000E+00 | 9.16175E−04 | −1.46687E−04 | 1.10000E−05 | −2.54480E−07 |
| 12 | 0.00000E+00 | 1.81417E−03 | −2.36147E−04 | 1.60000E−05 | −3.66559E−07 |

TABLE 11 shows the F-number fno, and the half field angle ω in the wide-angle end state (f=4.70), the intermediate focal length state (f=10.03), and the telescopic end state (f=23.04) in Numerical Example 3.

TABLE 11

| | WIDE | MID | TELE |
|---|---|---|---|
| f | 4.70 | 10.03 | 23.04 |
| fno | 2.43 | 3.43 | 6.03 |
| ω | 39.59 | 21.18 | 9.57 |

In the zoom lens 3, a surface interval D4 between the first lens group GR1 and the second lens group GR2, a surface interval D10 between the second lens group GR2 and the third lens group GR3, and a surface interval D12 between the third lens group GR3 and the filter FL are changed during the zooming between the wide-angle end state and the telescopic end state. TABLE 12 shows surface intervals in the wide-angle end state (f=4.70), the intermediate focal length state (f=10.03), and the telescopic end state (f=23.04) in the surface intervals in Numerical Example 3.

TABLE 12

|  | WIDE | MID | TELE |
|---|---|---|---|
| D4 | 18.123 | 6.233 | 0.730 |
| D10 | 4.718 | 9.877 | 15.136 |
| D12 | 3.585 | 2.933 | 2.020 |

Figure 10:
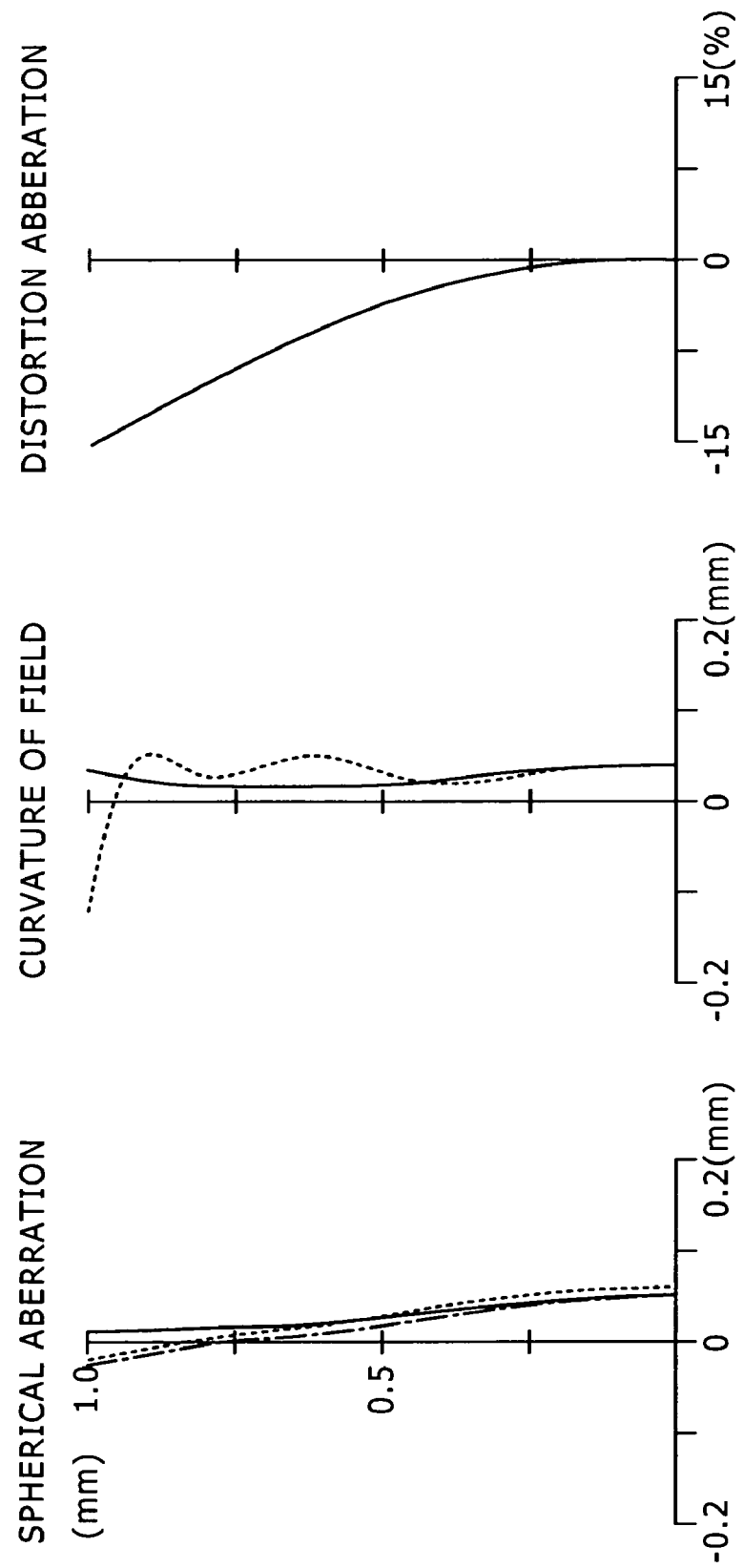
FIG. 10 is an aberration view of a numerical example in which concrete numerical values are applied to the zoom lens of the third embodiment together with FIGS. 11 and 12, and is also a view showing a spherical aberration, a curvature of field, and a distortion aberration in a wide-angle end state.
Figure 11:
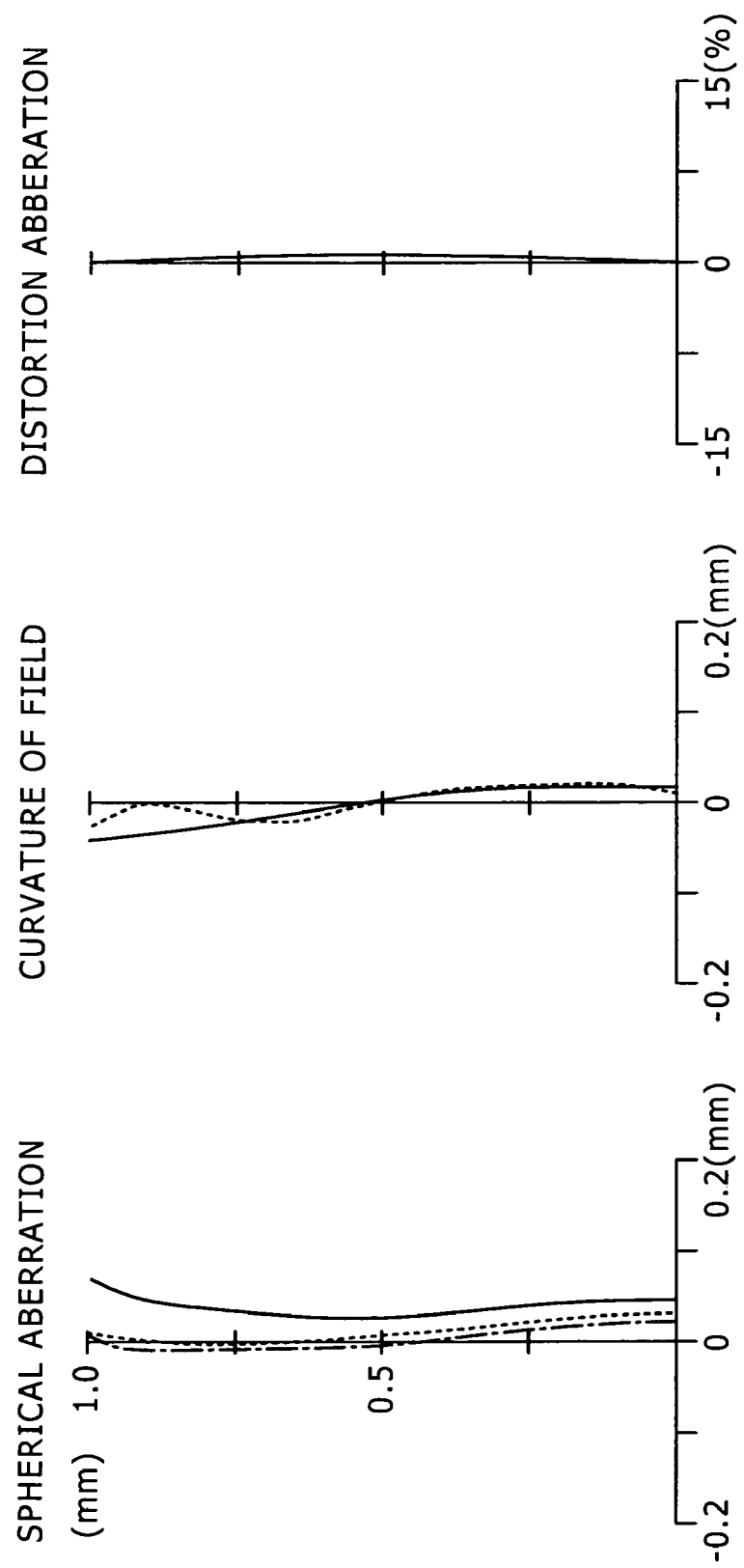
FIG. 11 is a view showing a spherical aberration, a curvature of field, and a distortion aberration in an intermediate focal length state.
Figure 12:
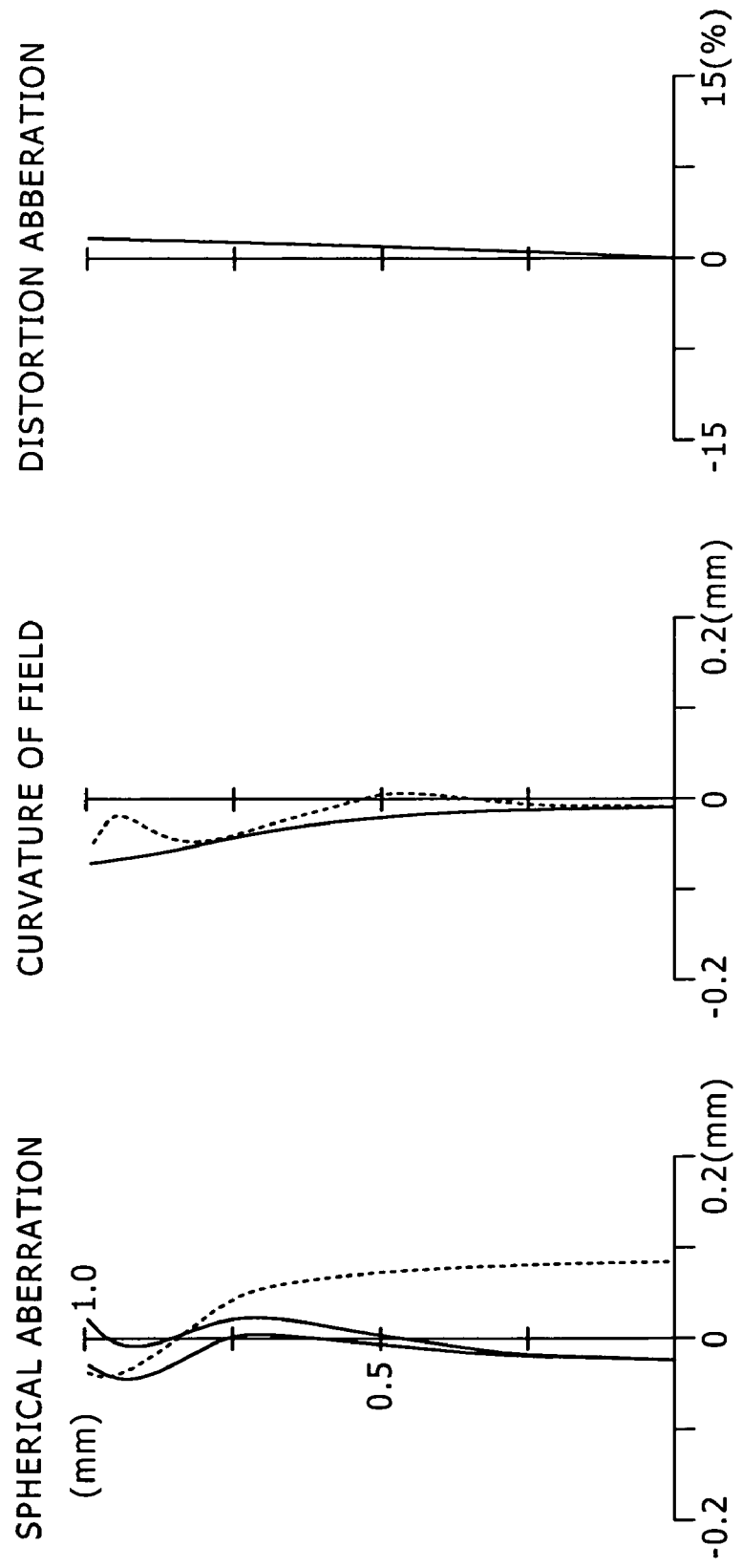
FIG. 12 is a view showing a spherical aberration, a curvature of field, and a distortion aberration in a telescopic end state.

FIGS. 10 to 12 show aberration views in an infinity focusing state in Numerical Example 3. FIG. 10 shows a spherical aberration view, a view of a curvature of field, and a distortion aberration view in the wide-angle end state. FIG. 11 shows a spherical aberration view, a view of a curvature of field, and a distortion aberration view in the intermediate focal length state. Also, FIG. 12 shows a spherical aberration view, a view of a curvature of field, and a distortion aberration view in the telescopic end state.

FIGS. 10 to 12 show values in a d line (wavelength: 587.6 nm) indicated by a solid line, a g line (wavelength: 435.8 nm) indicated by a chain line, and a c line (wavelength: 656.3 nm) indicated by a dotted line in the spherical aberration views, respectively. Also, in each of the views of the curvature of field, values in a sagittal image surface are indicated by a solid line, and values in a meridional image surface are indicated by a dotted line.

It is obvious from the aberration views shown in FIGS. 10 to 12 that the aberrations are satisfactorily corrected in Numerical Example 3, and thus Numerical Example 3 has the superior imaging performance.

Values of Conditional Expressions in Zoom Lenses

TABLE 13 shows values of the conditional expressions (1) to (12) in the zoom lenses 1 to 3 according to the first to third embodiment of the present disclosure.

TABLE 13

|  |  | Zoom lens 1 | Zoom lens 2 | Zoom lens 3 |
|---|---|---|---|---|
| Conditional expression (1) | ν 12 | 19.32 | 19.32 | 19.32 |
| Conditional expression (2) | n12 | 2.00270 | 2.00270 | 2.00270 |
|  | L11 ~ L12 | 1.61 | 1.64 | 1.64 |
|  | Lt | 35.70 | 34.85 | 35.45 |
| Conditional expression (3) | L11 ~ L12/Lt | 0.045 | 0.047 | 0.046 |
|  | ft | 22.80 | 22.09 | 23.04 |
| Conditional expression (4) | Lt/ft | 1.57 | 1.58 | 1.54 |
|  | Lw | 33.47 | 35.40 | 35.40 |
| Conditional expression (5) | Lt/Lw | 1.07 | 0.98 | 1.00 |
|  | β 2t | −2.25 | −2.06 | −2.12 |
|  | β 2w | −0.50 | −0.46 | −0.46 |
| Conditional expression (6) | β 2t/β 2w | 4.54 | 4.51 | 4.64 |
|  | L2Gtw | −17.59 | −16.73 | −17.44 |
| Conditional expression (7) | L2Gtw/{(Lt + Lw)/2} | 0.51 | 0.48 | 0.49 |
|  | L1G | 3.72 | 3.63 | 3.63 |
|  | L2G | 3.69 | 3.69 | 3.69 |
|  | L3G | 1.42 | 1.65 | 1.65 |
|  | α | 4.71 | 4.70 | 4.90 |
|  | fw | 4.84 | 4.70 | 4.70 |
| Conditional expression (8) | $(L1G + L2G + L3G)/\{\alpha \cdot (ft \cdot fw)^{1/2}\}$ | 0.18 | 0.19 | 0.18 |
| Conditional expression (9) | ν 21 | 67.02 | 63.85 | 63.85 |
|  | L21 ~ 23 | 3.69 | 3.69 | 3.69 |
| Conditional expression (10) | L21 ~ L23/ft | 0.162 | 0.167 | 0.160 |
| Conditional expression (11) | p3 | 0.054 | 0.058 | 0.057 |
| Conditional expression (12) | (L1G + L2G + L3G)/{(Lt + Lw)/2} | 0.255 | 0.255 | 0.253 |

As can be seen from TABLE 13, each of the zoom lenses 1 to 3 fulfills the conditional expressions (1) to (12).

Configuration of Imaging Apparatus of Fourth Embodiment

An imaging apparatus according to a fourth embodiment of the present disclosure includes a zoom lens, and an imaging element for converting an optical image formed by the zoom lens into an electrical signal. The zoom lens is constructed in such a way that a first lens group having a negative refractive power, a second lens group having a positive refractive power, and a third lens group having the positive refractive power are disposed in order from an object side to an image side.

In addition, in the imaging apparatus according to the fourth embodiment of the present invention, in the zoom lens, in the phase of the variable magnification from the wide-angle end to the telescopic end, the first lens group is moved and the second lens group is moved to the object side in such a way that the air interval between the first lens group and the second lens group is decreased and the air interval between the second lens group and the third lens group is increased.

In addition, in the imaging apparatus according to the fourth embodiment of the present invention, in the zoom lens, the first lens group is constructed in such a way that a negative lens whose both surfaces are formed in aspherical surfaces, respectively, and whose concave surface is directed to the image side, and a positive meniscus lens whose both surfaces are formed in spherical surfaces, respectively, and whose convex surface is directed to the object side are disposed in order from the object side to the image side. Also, a fixed aperture stop is disposed in the vicinity of the second lens group.

In addition thereto, in the imaging apparatus of the fourth embodiment, the zoom lens fulfills the conditional expressions (1) to (8):

$$\nu12<20; \tag{1}$$

$$n12>1.95; \tag{2}$$

$$(L11\sim L12)/Lt<0.07; \tag{3}$$

$$Lt/ft<1.65; \tag{4}$$

$$0.9<Lt/Lw<1.1; \tag{5}$$

$$\beta2t/\beta2w>4.3; \tag{6}$$

$$L2Gtw/\{(Lt+Lw)/2\}>0.45; \text{ and} \tag{7}$$

$$(L1G+L2G+L3G)/\{\alpha\cdot(ft\cdot fw)^{1/2}\}<0.2 \tag{8}$$

where ν12 is an Abbe's number of the positive meniscus lens of the first lens group, n12 is a refractive index in a d line of the positive meniscus lens of the first lens group, L11~L12 is an air interval from a surface apex on the image side of the negative lens of the first lens group to a surface apex on the object side of the positive meniscus lens of the first lens group, Lt is a distance from the surface apex on the object side of the negative lens of the first lens group to an image capturing surface in the telescopic end, ft is a focal length of an entire lens system in the telescopic end, Lw is a distance from the surface apex on the object side of the negative lens of the first lens group to the image capturing surface in the wide-angle end, $\beta 2t$ is a transverse magnification of the second lens group in the telescopic end, $\beta 2w$ is a transverse magnification of the second lens group in the wide-angle end, L2Gtw is an amount of movement of the second lens group in the phase of the variable magnification from the wide-angle end to the telescopic end, L1G is a distance from the surface apex on the object side to the surface apex on the image side of the first lens group, L2G is a distance from the surface apex on the object side to the surface apex on the image side of the second lens group, L3G is a distance from the surface apex on the object side to the surface apex on the image side of the third lens group, $\alpha$ is a variable magnification ratio, and fw is a focal length of the entire lens system in the wide-angle end.

The conditional expression (1) is an expression for regulating the Abbe's number of the positive meniscus lens of the first lens group.

When an upper limit of 20 in the conditional expression (1) is exceeded, an axial chromatic aberration in the telescopic end becomes deteriorated. Thus, for the purpose of correcting the axial chromatic aberration in the telescopic end, the refractive powers of the negative lens and the positive meniscus lens of the first lens group need to be weakened to increase an air interval between the negative lens and the positive meniscus lens of the first lens group. However, when the refractive powers of the negative lens and the positive meniscus lens of the first lens group are weakened to increase the air interval between the negative lens and the positive meniscus lens of the first lens group, a thickness of the first lens group is increased, which disturbs the miniaturization of the zoom lens.

Therefore, the zoom lens fulfills the conditional expression (1), whereby the axial chromatic aberration in the telescopic end can be prevented from becoming deteriorated, thereby miniaturizing the zoom lens.

The conditional expression (2) is an expression for regulating the refractive index in the d line of the positive meniscus lens of the first lens group.

When the refractive index, n12, in the d line of the positive meniscus lens of the first lens group falls below a lower limit of 1.95 in the refractive index in the d line of the positive meniscus lens of the first lens group, it becomes difficult to correct the spherical aberration in the telescopic end while an air interval between the negative lens and the positive meniscus lens of the first lens group is shortened.

Therefore, the zoom lens fulfills the conditional expression (2), whereby the spherical aberration in the telescopic end can be satisfactorily corrected while the thickness of the first lens group is decreased. The conditional expression (3) is an expression for regulating a ratio of the air interval from the surface apex on the image side of the negative lens of the first lens group to the surface apex on the object side of the positive meniscus of the first lens group to the distance from the surface apex on the object side of the negative lens of the first lens group to the image capturing surface in the telescopic end.

Although the zoom lens is used as a collapsible mount type optical system in some cases, in such cases, when the increased variable magnification is desired to be realized, the optical total length in the telescopic end is easy to be longer than that in the wide-angle end. Thus, the thickness in the phase of the storage of the zoom lens exerts a large influence together with the thicknesses of the first to third lens groups, especially, the thickness of the first lens group on the optical total length in the telescopic end. Therefore, for the purpose of shortening the optical total length in the phase of the storage of the zoom lens, there is required the satisfactory balance between the optical total length in the telescopic end and the thickness of the first lens group.

Then, the zoom lens fulfills the conditional expression (3), which results in that it is possible to shorten the distance between the negative lens of the first lens group and the second lens group in the telescopic end, it is possible to achieve a balance between the increased variable magnification and the shortening of the optical total length in the telescopic end. In addition, the thickness of the first lens group is decreased, and thus it is possible to achieve a balance between the shortening of the optical total length and the increased variable magnification in the phase of the storage of the zoom lens.

The conditional expression (4) is an expression for regulating a ratio of the distance from the surface apex on the object side of the negative lens of the first lens group to the image capturing surface in the telescopic end to the focal length of the entire lens system in the telescopic end.

Although when the increased variable magnification is desired to be realized, the optical total length is easy to be long, when the optical total length becomes long, it may be impossible to realize the miniaturization.

Then, the zoom lens fulfills the conditional expression (4), thereby making it possible to achieve a balance between the increased variable magnification and the miniaturization.

The conditional expression (5) is an expression for regulating a ratio of the distance from the surface apex on the object side of the negative lens of the first lens group to the image capturing surface in the telescopic end to the distance from the surface apex on the object side of the negative lens of the first lens group to the image capturing surface in the wide-angle end.

In the imaging apparatus of the fourth embodiment, in the zoom lens, the fixed aperture stop is disposed in the vicinity of the second lens group. Therefore, when the optical total length in the telescopic end becomes too long relative to the optical total length in the wide-angle end, an F-number in the telescopic end becomes too dark. On the other hand, when the optical total length in the telescopic end becomes too short relative to the optical total length in the wide-angle end, the F-number in the wide-angle end becomes too bright.

Then the zoom lens fulfills the conditional expression (5), which results in that the F-number in the telescopic end does not become extremely dark, and also the F-number in the wide-angle end does not become extremely bright. As a result, both of the miniaturization and the high performance can be realized.

The conditional expression (6) is an expression for regulating a ratio of the transverse magnification of the second lens group in the telescopic end to the transverse magnification of the second lens group in the wide-angle end.

In the imaging apparatus of the fourth embodiment, in the zoom lens, an amount of movement of the second lens group is set larger than that of any of the first and third lens groups. Thus, an amount of movement of the second lens group exerts a large influence on the variable magnification.

Then, the zoom lens fulfills the conditional expression (6), which results in that an amount of movement of the second lens group in the phase of the variable magnification can be suitably set for the optical total length, and both of the miniaturization and the increased variable magnification can be realized.

The conditional expression (7) is an expression for regulating a relationship between an amount of movement of the second lens group and the thickness of the negative lens of the first lens group.

In the zoom lens of the embodiment of the present disclosure, an amount of movement of the second lens group is set larger than that of any of the first and third lens groups. Thus, an amount of movement of the second lens group exerts a large influence on the variable magnification.

Then, the zoom lens fulfills the conditional expression (7), which results in that an amount of movement of the second lens group in the phase of the variable magnification can be suitably set for the optical total length, and both of the miniaturization and the increased variable power can be realized.

The conditional expression (8) is an expression for regulating a ratio of the thicknesses of the first to third lens groups to the focal length of the entire lens system in the wide-angle end.

When an upper limit of the conditional expression (8) is exceeded, the thickness in the phase of the storage of the zoom lens becomes too large, and also it becomes difficult to ensure the high variable magnification ratio.

Then, the zoom lens fulfills the conditional expression (8), which results in that both of the increased variable magnification and the miniaturization can be realized. In particular, it becomes possible to carry out the satisfactory aberration correction, and it becomes possible to shorten the optical total length in the phase of the storage of the zoom lens.

Imaging Apparatus of Fourth Embodiment

Figure 13:
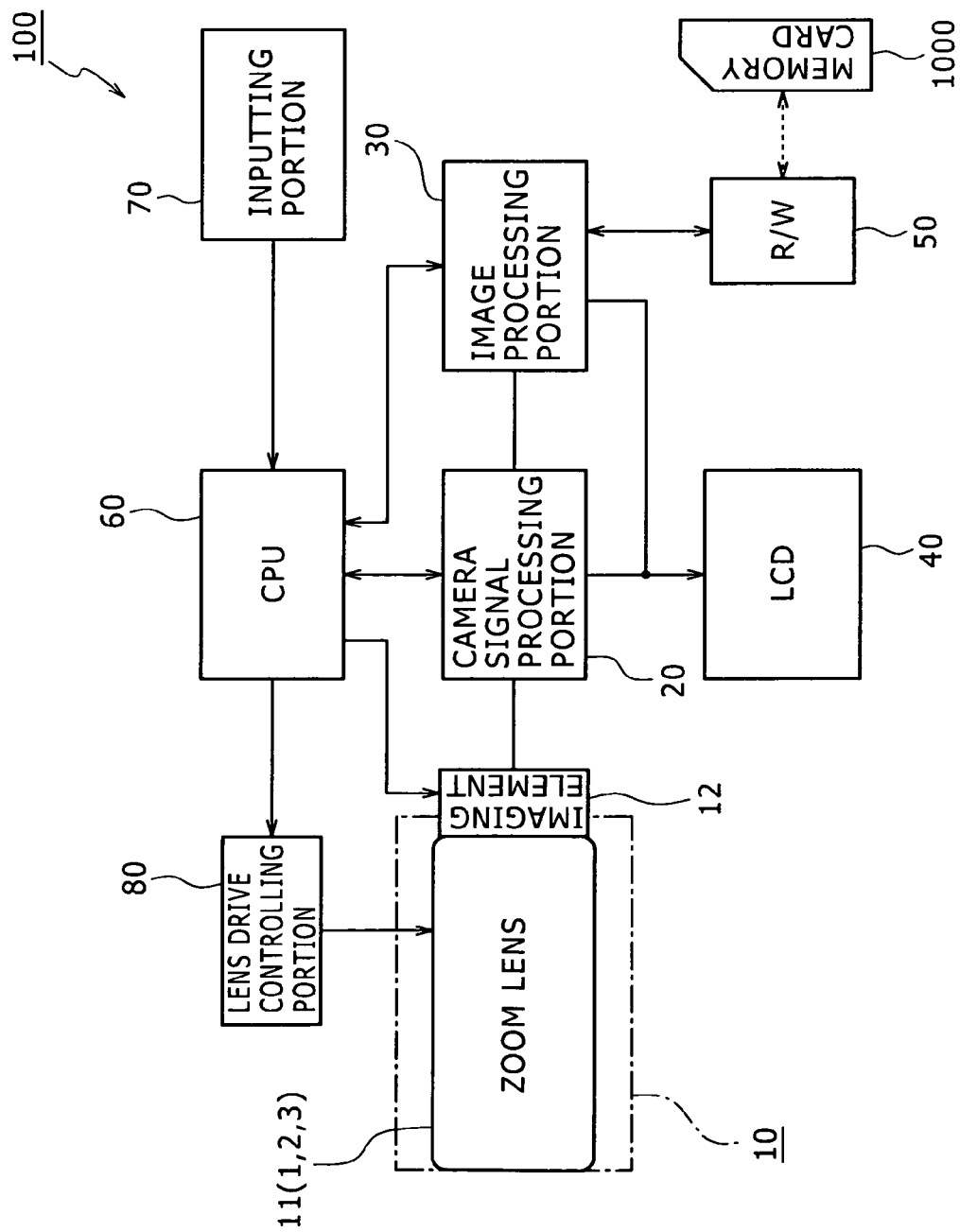
FIG. 13 is a block diagram showing a configuration of an imaging apparatus according to a fourth embodiment of the present disclosure.

FIG. 13 shows a block diagram of a digital still camera as the imaging apparatus according to the fourth embodiment of the present disclosure.

The imaging apparatus (digital still camera) 100 includes a camera block 10, a camera signal processing portion 20, and an image processing portion 30. In this case, the camera block 10 takes the function of image capturing. The camera signal processing 20 executes signal processing such as analog-to-digital conversion for an image signal corresponding to an image captured by the camera block 10. Also, the image processing portion 30 executes processing for recording/reproducing the image signal. In addition, the imaging apparatus 100 includes a Liquid Crystal Display (LCD) device 40, a Reader/Writer (R/W) 50, a Central Processing Unit (CPU) 60, an inputting portion 70, and a lens drive controlling portion 80. In this case, the LCD device 40 displays thereon the image or the like captured by the camera block 10. The R/W 50 writes and reads out the image signal to and from a memory card 1000. The CPU 60 controls the entire operation of the imaging apparatus 100. The inputting portion 70 is composed of various kinds of switches or the like with which the user carries out the desired manipulation. Also, the lens drive controlling portion 80 controls the drive for the lenses disposed in the camera block 10.

The camera block 10 is composed of an optical system including a zoom lens 11 (such as the zoom lens 1, 2 or 3 to which the present disclosure is applied), an imaging element 12 such as a Charge Coupled Device (CCD) or a Complementary Metal Oxide Semiconductor (CMOS), and the like.

The camera signal processing portion 20 executes various kinds of signal processing such as processing for converting an output signal supplied thereto from the imaging element 12 into a digital signal, processing for removing a noise from the output signal supplied thereto from the imaging element 12, processing for correcting an image quality for the output signal from the imaging element 12, and processing for converting the output signal from the imaging element 12 into a luminance/color difference signal.

The image processing portion 30 executes processing for compression encoding/expansion decoding the image signal in accordance with a predetermined image data format, processing for converting a data specification such as a resolution, and the like.

The LCD device 40 has a function of displaying thereon various kinds of data on a state of a manipulation made for the inputting portion 70 by the user, the captured image and the like.

The R/W 50 writes image data encoded by the image processing portion 30 to the memory card 1000 and reads out image data recorded in the memory card 1000 from the memory card 1000.

The CPU 60 functions as a control processing portion for controlling the individual circuit blocks provided in the imaging apparatus 100. Also, the CPU 60 controls the individual circuit blocks in accordance with an instruction input signal or the like outputted thereto from the inputting portion 70.

The inputting portion 70, for example, is composed of a shutter release button with which a shutter manipulation is carried out by the user, a selection switch with which an operation mode is selected by the user, or the like. Also, the inputting portion 70 outputs the instruction input signal corresponding to the manipulation made by the user to the CPU 60.

The lens drive controlling portion 80 controls a motor or the like (not shown) for driving the lenses of the zoom lens 11 in accordance with a control signal issued thereto from the CPU 60.

The memory card 1000, for example, is a semiconductor memory which is detachably inserted into a slot connected to the R/W 50.

Hereinafter, an operation of the imaging apparatus 100 will be described in detail.

In a stand-by state of the image capturing, a signal of an image captured by the camera block 10 is outputted to the LCD device 40 through the camera signal processing portion 20 under the control made by the CPU 60 to be displayed as a camera-through image on the LCD device 40. In addition, when the instruction input signal for zooming has been inputted from the inputting portion 70 to the CPU 60, the CPU 60 outputs the control signal to the lens drive controlling portion 80, so that the predetermined lens(es) of the zoom lens 11 is(are) moved in accordance with the control made by the lens drive controlling portion 80.

When a shutter button (not shown) of the camera block 10 has been operated in accordance with the instruction input signal outputted from the inputting portion 70, the signal of the image captured by the camera block 10 is outputted from the camera signal processing portion 20 to the image processing portion 30, and is then subjected to compression encoding processing to be converted into digital data complying with a predetermined data format. The data obtained through the analog-to-digital conversion is outputted to the R/W 50 and is then written to the memory card 1000.

It is noted that, for example, in the case where the shutter release button of the inputting portion 70 is depressed halfway, in the case where the shutter release button of the inputting portion 70 is fully depressed for the recording (image capturing), or in any other suitable case, the lens drive controlling portion 80 moves the predetermined lens(es) of the zoom lens 11 in accordance with the control signal supplied thereto from the CPU 60, thereby carrying out the focusing.

When the image data recorded in the memory card 1000 is desired to be reproduced, predetermined image data is read out from the memory card 1000 by the R/W 50 in accordance with the manipulation made for the inputting portion 70 by the user, and is then subjected to the expansion decoding processing by the image processing portion 30. After that, a regenerative image signal is outputted to the LCD device 40, thereby displaying the regenerative image on the LCD device 40.

It should be noted that in the fourth embodiment of the present disclosure, the description has been given so far with respect to the case where the imaging apparatus is applied to the digital still camera, the application range of the imaging apparatus is by no means limited to the digital still camera. That is to say, the imaging apparatus can be generally applied as a camera portion or the like of a digital I/O apparatus such as a digital video camera, a mobile phone having a camera incorporated therein, or a Personal Digital Assistant (PDA) having a camera incorporated therein.

The shapes and numerical values of the portions shown in the embodiments described above are merely an example of concretization for embodying the present disclosure. Thus, the technical scope of the present disclosure should not be intended to be construed in a limiting sense by such shapes and numerical values.

The present disclosure contains subject matter related to that disclosed in Japanese Priority Patent Application JP 2010-221338 filed in the Japan Patent Office on Sep. 30, 2010, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A zoom lens, wherein a first lens group having a negative refractive power, a second lens group having a positive refractive power, and a third lens group having the positive refractive power are disposed in order from an object side to an image side;

in a phase of variable magnification from a wide-angle end to a telescopic end, said first lens group is moved and said second lens group is moved to the object side in such a way that an air interval between said first lens group and said second lens group is decreased and an air interval between said second lens group and said third lens group is increased;

said first lens group is constructed in such a way that a negative lens whose both surfaces are formed in aspherical surfaces, respectively, and whose concave surface is directed to the image side, and a positive meniscus lens whose both surfaces are formed in spherical surfaces, respectively, and whose convex surface is directed to the object side are disposed in order from the object side to the image side;

a fixed aperture stop is disposed in a vicinity of said second lens group; and conditional expressions (1) to (8) are fulfilled:

$$v12 < 20; \tag{1}$$

$$n12 > 1.95; \tag{2}$$

$$(L11 \sim L12)/Lt < 0.07; \tag{3}$$

$$Lt/ft < 1.65; \tag{4}$$

$$0.9 < Lt/Lw < 1.1; \tag{5}$$

$$\beta 2t/\beta 2w > 4.3; \tag{6}$$

$$L2Gtw/\{(Lt+Lw)/2\} > 0.45; \text{ and} \tag{7}$$

$$(L1G+L2G+L3G)/\{\alpha \cdot (ft \cdot fw)^{1/2}\} < 0.2 \tag{8}$$

where v12 is an Abbe's number of said positive meniscus lens of said first lens group, n12 is a refractive index in a d line of said positive meniscus lens of said first lens group, L11~L12 is an air interval from a surface apex on the image side of said negative lens of said first lens group to a surface apex on the object side of said positive meniscus lens of said first lens group, Lt is a distance from the surface apex on the object side of the negative lens of said first lens group to an image capturing surface in the telescopic end, ft is a focal length of an entire lens system in the telescopic end, Lw is a distance from the surface apex on the object side of said negative lens of said first lens group to the image capturing surface in said wide-angle end, β2t is a transverse magnification of said second lens group in the telescopic end, β2w is a transverse magnification of said second lens group in the wide-angle end, L2Gtw is an amount of movement of said second lens group in the phase of the variable magnification from the wide-angle end to the telescopic end, L1G is a distance from the surface apex on the object side to the surface apex on the image side of said first lens group, L2G is a distance from the surface apex on the object side to the surface apex on the image side of said second lens group, L3G is a distance from the surface apex on the object side to the surface apex on the image side of said third lens group, α is a variable magnification ratio, and fw is a focal length of the entire lens system in said wide-angle end.

2. The zoom lens according to claim 1, wherein in said second lens group, at least a first positive lens whose surface on the object side is formed in an aspherical surface, and a cemented lens obtained by joining a second positive lens and a negative lens to each other are disposed in order from the object side to the image side, and conditional expressions (9) and (10) are fulfilled:

$$v21 > 60; \text{ and} \tag{9}$$

$$(L21 \sim L23)/ft < 0.18 \tag{10}$$

where v21 is an Abbe's number of said first positive lens of said second lens group, and L21~L23 is a distance from a surface apex on the object side of said first positive lens of said second lens group to a surface apex on the image side of said cemented lens.

3. The zoom lens according to claim 2, wherein said first positive lens is a lens whose convex surface is directed to the object side, and said aperture stop is disposed closer to the image side than to the surface apex on the object side of said first positive lens, and closer to the object side than to the surface apex on the image side of said first positive lens.

4. The zoom lens according to claim 1, wherein said third lens group is made as a focus lens group composed of one sheet of positive lens made of a resin, and fulfills a conditional expression (11):

$$0.045 < p3 < 0.06 \tag{11}$$

where p3 is a refractive power of said third lens group.

5. The zoom lens according to claim 1, wherein a conditional expression (12) is fulfilled:

$$0.2 < (L1G+L2G+L3G)/\{(Lt+Lw)/2\} < 0.3. \tag{12}$$

6. An imaging apparatus, comprising:
a zoom lens; and
an imaging element transforming an optical image formed by said zoom lens into an electrical signal,
wherein in said zoom lens, a first lens group having a negative refractive power, a second lens group having a positive refractive power, and a third lens group having the positive refractive power are disposed in order from an object side to an image side;
in a phase of variable magnification from a wide-angle end to a telescopic end, said first lens group is moved and said second lens group is moved to the object side in such a way that an air interval between said first lens group and said second lens group is decreased and an air interval between said second lens group and said third lens group is increased;
said first lens group is constructed in such a way that a negative lens whose both surfaces are formed in aspherical surfaces, respectively, and whose concave surface is directed to the image side, and a positive meniscus lens whose both surfaces are formed in spherical surfaces, respectively, and whose convex surface is directed to the object side are disposed in order from the object side to the image side;
a fixed aperture stop is disposed in a vicinity of said second lens group; and
conditional expressions (1) to (8) are fulfilled:

$$v12 < 20; \tag{1}$$

$$n12 > 1.95; \tag{2}$$

$$(L11 \sim L12)/Lt < 0.07; \tag{3}$$

$$Lt/ft < 1.65; \tag{4}$$

$$0.9 < Lt/Lw < 1.1; \tag{5}$$

$$\beta 2t/\beta 2w > 4.3; \tag{6}$$

$$L2Gtw/\{(Lt+Lw)/2\} > 0.45; \text{ and} \tag{7}$$

$$(L1G+L2G+L3G)/\{\alpha \cdot (ft \cdot fw)^{1/2}\} < 0.2 \tag{8}$$

where v12 is an Abbe's number of said positive meniscus lens of said first lens group, n12 is a refractive index in a d line of said positive meniscus lens of said first lens group, L11~L12 is an air interval from a surface apex on the image side of said negative lens of said first lens group to a surface apex on the object side of said positive meniscus lens of said first lens group, Lt is a distance from the surface apex on the object side of the negative lens of said first lens group to an image capturing surface in the telescopic end, ft is a focal length of an entire lens system in the telescopic end, Lw is a distance from the surface apex on the object side of said negative lens of said first lens group to the image capturing surface in said wide-angle end, β2t is a transverse magnification of said second lens group in the telescopic end, β2w is a transverse magnification of said second lens group in the wide-angle end, L2Gtw is an amount of movement of said second lens group in the phase of the variable magnification from the wide-angle end to the telescopic end, L1G is a distance from the surface apex on the object side to the surface apex on the image side of said first lens group, L2G is a distance from the surface apex on the object side to the surface apex on the image side of said second lens group, L3G is a distance from the surface apex on the object side to the surface apex on the image side of said third lens group, α is a variable magnification ratio, and fw is a focal length of the entire lens system in the wide-angle end.

* * * * *